(12) United States Patent
Viswanathan

(10) Patent No.: US 12,496,123 B2
(45) Date of Patent: Dec. 16, 2025

(54) CONTOURED ELECTRODES FOR PULSED ELECTRIC FIELD ABLATION, AND SYSTEMS, DEVICES, AND METHODS THEREOF

(71) Applicant: Boston Scientific Scimed, Inc., Maple Grove, MN (US)

(72) Inventor: Raju Viswanathan, Mountain View, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1086 days.

(21) Appl. No.: 17/469,300

(22) Filed: Sep. 8, 2021

(65) Prior Publication Data

US 2022/0071699 A1 Mar. 10, 2022

Related U.S. Application Data

(60) Provisional application No. 63/075,729, filed on Sep. 8, 2020.

(51) Int. Cl.
*A61B 18/14* (2006.01)
*A61B 18/00* (2006.01)
*A61B 18/12* (2006.01)

(52) U.S. Cl.
CPC .. *A61B 18/1492* (2013.01); *A61B 2018/0022* (2013.01); *A61B 2018/00577* (2013.01);
(Continued)

(58) Field of Classification Search
CPC ..... A61B 18/12; A61B 18/14; A61B 18/1402; A61B 18/1492; A61B 2018/00577;
(Continued)

(56) References Cited

U.S. PATENT DOCUMENTS 4,200,104 A 4/1980 Harris
4,470,407 A 9/1984 Hussein
(Continued)

FOREIGN PATENT DOCUMENTS

AU 741167 B2 11/2001
EP 1042990 A1 10/2000
(Continued)

OTHER PUBLICATIONS

Office Action received for Japanese Patent Application No. 2023-515668, mailed on Feb. 13, 2024, 9 pages of Engish translation only.
(Continued)

*Primary Examiner* — Thomas A Giuliani
(74) *Attorney, Agent, or Firm* — Nelson Mullins Riley & Scarborough LLP

(57) ABSTRACT

Systems, devices, and methods are provided herein for delivering pulsed electric fields to ablation tissue (e.g., cardiac tissue). An ablation device can include one or more contoured electrodes with contoured edges that are disposed on an insulating member of the ablation device. The contoured electrodes can be configured to reduce an electric field intensity at an interface between the contoured electrodes and the insulating member and/or a drop-off in electric field intensity.

18 Claims, 19 Drawing Sheets

(52) U.S. Cl.
CPC .............. *A61B 2018/00613* (2013.01); *A61B 2018/126* (2013.01); *A61B 2018/1405* (2013.01)

(58) Field of Classification Search
CPC ...... A61B 2018/126; A61B 2018/1405; A61B 2018/00267; A61B 2018/1467; A61B 2018/0016; A61B 2018/00214
USPC ............ 606/41, 42, 49, 50; 607/98, 99, 101, 607/113, 115, 116
See application file for complete search history.

(56) References Cited

U.S. PATENT DOCUMENTS

| | | |
|---|---|---|
| 4,739,759 A | 4/1988 | Rexroth et al. |
| 5,234,004 A | 8/1993 | Hascoet et al. |
| 5,242,441 A | 9/1993 | Avitall |
| 5,257,635 A | 11/1993 | Langberg |
| 5,281,213 A | 1/1994 | Milder et al. |
| 5,304,214 A | 4/1994 | Deford et al. |
| 5,306,296 A | 4/1994 | Wright et al. |
| 5,334,183 A | 8/1994 | Wuchinich |
| 5,334,193 A | 8/1994 | Nardella |
| 5,341,807 A | 8/1994 | Nardella |
| 5,342,301 A | 8/1994 | Saab |
| 5,398,683 A | 3/1995 | Edwards et al. |
| 5,443,463 A | 8/1995 | Stern et al. |
| 5,454,370 A | 10/1995 | Avitall |
| 5,515,848 A | 5/1996 | Corbett et al. |
| 5,531,685 A | 7/1996 | Hemmer et al. |
| 5,545,161 A | 8/1996 | Imran |
| 5,578,040 A | 11/1996 | Smith |
| 5,617,854 A | 4/1997 | Munsif |
| 5,624,430 A | 4/1997 | Eton et al. |
| 5,667,491 A | 9/1997 | Pliquett et al. |
| 5,672,170 A | 9/1997 | Cho et al. |
| 5,700,243 A | 12/1997 | Narciso, Jr. |
| 5,702,438 A | 12/1997 | Avitall |
| 5,706,823 A | 1/1998 | Wodlinger |
| 5,722,400 A | 3/1998 | Ockuly et al. |
| 5,722,402 A | 3/1998 | Swanson et al. |
| 5,749,914 A | 5/1998 | Janssen |
| 5,779,699 A | 7/1998 | Lipson |
| 5,788,692 A | 8/1998 | Campbell et al. |
| 5,810,762 A | 9/1998 | Hofmann |
| 5,833,710 A | 11/1998 | Jacobson |
| 5,836,874 A | 11/1998 | Swanson et al. |
| 5,836,942 A | 11/1998 | Netherly et al. |
| 5,836,947 A | 11/1998 | Fleischman et al. |
| 5,843,154 A | 12/1998 | Osypka |
| 5,849,028 A | 12/1998 | Chen |
| 5,860,974 A | 1/1999 | Abele |
| 5,863,291 A | 1/1999 | Schaer |
| 5,868,736 A | 2/1999 | Swanson et al. |
| 5,871,523 A | 2/1999 | Fleischman et al. |
| 5,876,336 A | 3/1999 | Swanson et al. |
| 5,885,278 A | 3/1999 | Fleischman |
| 5,895,404 A | 4/1999 | Ruiz |
| 5,899,917 A | 5/1999 | Edwards et al. |
| 5,904,709 A | 5/1999 | Arndt et al. |
| 5,916,158 A | 6/1999 | Webster, Jr. |
| 5,916,213 A | 6/1999 | Haissaguerre et al. |
| 5,921,924 A | 7/1999 | Avitall |
| 5,928,269 A | 7/1999 | Alt |
| 5,928,270 A | 7/1999 | Ramsey, III |
| 5,938,660 A | 8/1999 | Swartz et al. |
| 6,002,955 A | 12/1999 | Willems et al. |
| 6,006,131 A | 12/1999 | Cooper et al. |
| 6,009,351 A | 12/1999 | Flachman |
| 6,014,579 A | 1/2000 | Pomeranz et al. |
| 6,029,671 A | 2/2000 | Stevens et al. |
| 6,033,403 A | 3/2000 | Tu et al. |
| 6,035,238 A | 3/2000 | Ingle et al. |
| 6,045,550 A | 4/2000 | Simpson et al. |
| 6,068,653 A | 5/2000 | LaFontaine |
| 6,071,274 A | 6/2000 | Thompson et al. |
| 6,071,281 A | 6/2000 | Burnside et al. |
| 6,074,389 A | 6/2000 | Levine et al. |
| 6,076,012 A | 6/2000 | Swanson et al. |
| 6,090,104 A | 7/2000 | Webster, Jr. |
| 6,096,036 A | 8/2000 | Bowe et al. |
| 6,113,595 A | 9/2000 | Muntermann |
| 6,119,041 A | 9/2000 | Pomeranz et al. |
| 6,120,500 A | 9/2000 | Bednarek et al. |
| 6,142,993 A | 11/2000 | Whayne et al. |
| 6,146,381 A | 11/2000 | Bowe et al. |
| 6,164,283 A | 12/2000 | Lesh |
| 6,167,291 A | 12/2000 | Barajas et al. |
| 6,171,305 B1 | 1/2001 | Sherman |
| 6,216,034 B1 | 4/2001 | Hofmann et al. |
| 6,219,582 B1 | 4/2001 | Hofstad et al. |
| 6,223,085 B1 | 4/2001 | Dann et al. |
| 6,231,518 B1 | 5/2001 | Grabek et al. |
| 6,245,064 B1 | 6/2001 | Lesh et al. |
| 6,251,107 B1 | 6/2001 | Schaer |
| 6,251,109 B1 | 6/2001 | Hassett et al. |
| 6,251,128 B1 | 6/2001 | Knopp et al. |
| 6,270,476 B1 | 8/2001 | Santoianni et al. |
| 6,272,384 B1 | 8/2001 | Simon et al. |
| 6,287,306 B1 | 9/2001 | Kroll et al. |
| 6,314,963 B1 | 11/2001 | Vaska et al. |
| 6,322,559 B1 | 11/2001 | Daulton et al. |
| 6,350,263 B1 | 2/2002 | Wetzig et al. |
| 6,370,412 B1 | 4/2002 | Armoundas et al. |
| 6,391,024 B1 | 5/2002 | Sun et al. |
| 6,447,505 B2 | 9/2002 | McGovern et al. |
| 6,464,699 B1 | 10/2002 | Swanson |
| 6,470,211 B1 | 10/2002 | Ideker et al. |
| 6,502,576 B1 | 1/2003 | Lesh |
| 6,503,247 B2 | 1/2003 | Swartz et al. |
| 6,517,534 B1 | 2/2003 | McGovern et al. |
| 6,527,724 B1 | 3/2003 | Fenici |
| 6,527,767 B2 | 3/2003 | Wang et al. |
| 6,592,581 B2 | 7/2003 | Bowe |
| 6,595,991 B2 | 7/2003 | Toellner et al. |
| 6,607,520 B2 | 8/2003 | Keane |
| 6,613,046 B1 | 9/2003 | Jenkins et al. |
| 6,623,480 B1 | 9/2003 | Kuo et al. |
| 6,638,278 B2 | 10/2003 | Falwell et al. |
| 6,666,863 B2 | 12/2003 | Wentzel et al. |
| 6,669,693 B2 | 12/2003 | Friedman |
| 6,702,811 B2 | 3/2004 | Stewart et al. |
| 6,719,756 B1 | 4/2004 | Muntermann |
| 6,723,092 B2 | 4/2004 | Brown et al. |
| 6,728,563 B2 | 4/2004 | Rashidi |
| 6,743,225 B2 | 6/2004 | Sanchez et al. |
| 6,743,226 B2 | 6/2004 | Cosman et al. |
| 6,743,239 B1 | 6/2004 | Kuehn et al. |
| 6,764,486 B2 | 7/2004 | Natale |
| 6,780,181 B2 | 8/2004 | Kroll et al. |
| 6,805,128 B1 | 10/2004 | Pless et al. |
| 6,807,447 B2 | 10/2004 | Griffin, III |
| 6,892,091 B1 | 5/2005 | Ben-Haim et al. |
| 6,893,438 B2 | 5/2005 | Hall et al. |
| 6,926,714 B1 | 8/2005 | Sra |
| 6,955,173 B2 | 10/2005 | Lesh |
| 6,960,206 B2 | 11/2005 | Keane |
| 6,960,207 B2 | 11/2005 | Vanney et al. |
| 6,972,016 B2 | 12/2005 | Hill et al. |
| 6,973,339 B2 | 12/2005 | Govari |
| 6,979,331 B2 | 12/2005 | Hintringer et al. |
| 6,984,232 B2 | 1/2006 | Vanney et al. |
| 6,985,776 B2 | 1/2006 | Kane et al. |
| 7,001,383 B2 | 2/2006 | Keidar |
| 7,041,095 B2 | 5/2006 | Wang et al. |
| 7,113,831 B2 | 9/2006 | Hooven |
| 7,171,263 B2 | 1/2007 | Darvish et al. |
| 7,182,725 B2 | 2/2007 | Bonan et al. |
| 7,195,628 B2 | 3/2007 | Falkenberg |
| 7,207,988 B2 | 4/2007 | Leckrone et al. |
| 7,207,989 B2 | 4/2007 | Pike et al. |
| 7,229,402 B2 | 6/2007 | Diaz et al. |
| 7,229,437 B2 | 6/2007 | Johnson et al. |

(56) References Cited

U.S. PATENT DOCUMENTS

| | | |
|---|---|---|
| 7,250,049 B2 | 7/2007 | Roop et al. |
| 7,285,116 B2 | 10/2007 | De et al. |
| 7,285,119 B2 | 10/2007 | Stewart et al. |
| 7,326,208 B2 | 2/2008 | Vanney et al. |
| 7,346,379 B2 | 3/2008 | Eng et al. |
| 7,367,974 B2 | 5/2008 | Haemmerich et al. |
| 7,374,567 B2 | 5/2008 | Heuser |
| 7,387,629 B2 | 6/2008 | Vanney et al. |
| 7,387,630 B2 | 6/2008 | Mest |
| 7,387,636 B2 | 6/2008 | Cohn et al. |
| 7,416,552 B2 | 8/2008 | Paul et al. |
| 7,419,477 B2 | 9/2008 | Simpson et al. |
| 7,419,489 B2 | 9/2008 | Vanney et al. |
| 7,422,591 B2 | 9/2008 | Phan |
| 7,429,261 B2 | 9/2008 | Kunis et al. |
| 7,435,248 B2 | 10/2008 | Taimisto et al. |
| 7,513,896 B2 | 4/2009 | Orszulak |
| 7,527,625 B2 | 5/2009 | Knight et al. |
| 7,578,816 B2 | 8/2009 | Boveja et al. |
| 7,588,567 B2 | 9/2009 | Boveja et al. |
| 7,623,899 B2 | 11/2009 | Worley et al. |
| 7,678,108 B2 | 3/2010 | Chrisitian et al. |
| 7,681,579 B2 | 3/2010 | Schwartz |
| 7,771,421 B2 | 8/2010 | Stewart et al. |
| 7,805,182 B2 | 9/2010 | Weese et al. |
| 7,842,031 B2 | 11/2010 | Abboud et al. |
| 7,850,642 B2 | 12/2010 | Moll et al. |
| 7,850,685 B2 | 12/2010 | Kunis et al. |
| 7,857,808 B2 | 12/2010 | Oral et al. |
| 7,857,809 B2 | 12/2010 | Drysen |
| 7,869,865 B2 | 1/2011 | Govari et al. |
| 7,896,873 B2 | 3/2011 | Hiller et al. |
| 7,917,211 B2 | 3/2011 | Zacouto |
| 7,918,819 B2 | 4/2011 | Karmarkar et al. |
| 7,918,850 B2 | 4/2011 | Govari et al. |
| 7,922,714 B2 | 4/2011 | Stevens-Wright |
| 7,955,827 B2 | 6/2011 | Rubinsky et al. |
| 8,048,067 B2 | 11/2011 | Davalos et al. |
| 8,048,072 B2 | 11/2011 | Verin et al. |
| 8,100,895 B2 | 1/2012 | Panos et al. |
| 8,100,900 B2 | 1/2012 | Prinz et al. |
| 8,108,069 B2 | 1/2012 | Stahler et al. |
| 8,133,220 B2 | 3/2012 | Lee et al. |
| 8,137,342 B2 | 3/2012 | Crossman |
| 8,145,289 B2 | 3/2012 | Calabro' et al. |
| 8,147,486 B2 | 4/2012 | Honour et al. |
| 8,160,690 B2 | 4/2012 | Wilfley et al. |
| 8,175,680 B2 | 5/2012 | Panescu |
| 8,182,477 B2 | 5/2012 | Orszulak et al. |
| 8,206,384 B2 | 6/2012 | Falwell et al. |
| 8,206,385 B2 | 6/2012 | Stangenes et al. |
| 8,216,221 B2 | 7/2012 | Ibrahim et al. |
| 8,221,411 B2 | 7/2012 | Francischelli et al. |
| 8,226,648 B2 | 7/2012 | Paul et al. |
| 8,228,065 B2 | 7/2012 | Wirtz et al. |
| 8,235,986 B2 | 8/2012 | Kulesa et al. |
| 8,235,988 B2 | 8/2012 | Davis et al. |
| 8,251,986 B2 | 8/2012 | Chornenky et al. |
| 8,282,631 B2 | 10/2012 | Davalos et al. |
| 8,287,532 B2 | 10/2012 | Carroll et al. |
| 8,414,508 B2 | 4/2013 | Thapliyal et al. |
| 8,430,875 B2 | 4/2013 | Ibrahim et al. |
| 8,433,394 B2 | 4/2013 | Harlev et al. |
| 8,449,535 B2 | 5/2013 | Deno et al. |
| 8,454,594 B2 | 6/2013 | Demarais et al. |
| 8,463,368 B2 | 6/2013 | Harlev et al. |
| 8,475,450 B2 | 7/2013 | Govari et al. |
| 8,486,063 B2 | 7/2013 | Werneth et al. |
| 8,500,733 B2 | 8/2013 | Watson |
| 8,535,304 B2 | 9/2013 | Sklar et al. |
| 8,538,501 B2 | 9/2013 | Venkatachalam et al. |
| 8,562,588 B2 | 10/2013 | Hobbs et al. |
| 8,568,406 B2 | 10/2013 | Harlev et al. |
| 8,568,410 B2 | 10/2013 | Vakharia et al. |
| 8,571,635 B2 | 10/2013 | Mcgee |
| 8,571,647 B2 | 10/2013 | Harlev et al. |
| 8,579,897 B2 | 11/2013 | Vakharia et al. |
| 8,585,695 B2 | 11/2013 | Shih |
| 8,588,885 B2 | 11/2013 | Hall et al. |
| 8,597,288 B2 | 12/2013 | Christian |
| 8,608,735 B2 | 12/2013 | Govari et al. |
| 8,628,522 B2 | 1/2014 | Ibrahim et al. |
| 8,632,534 B2 | 1/2014 | Pearson et al. |
| 8,647,338 B2 | 2/2014 | Chornenky et al. |
| 8,708,952 B2 | 4/2014 | Cohen et al. |
| 8,734,442 B2 | 5/2014 | Cao et al. |
| 8,771,267 B2 | 7/2014 | Kunis et al. |
| 8,795,310 B2 | 8/2014 | Fung et al. |
| 8,808,273 B2 | 8/2014 | Caples et al. |
| 8,808,281 B2 | 8/2014 | Emmons et al. |
| 8,834,461 B2 | 9/2014 | Werneth et al. |
| 8,834,464 B2 | 9/2014 | Stewart et al. |
| 8,868,169 B2 | 10/2014 | Narayan et al. |
| 8,876,817 B2 | 11/2014 | Avitall et al. |
| 8,880,195 B2 | 11/2014 | Azure |
| 8,886,309 B2 | 11/2014 | Luther et al. |
| 8,903,488 B2 | 12/2014 | Callas et al. |
| 8,920,411 B2 | 12/2014 | Gelbart et al. |
| 8,926,589 B2 | 1/2015 | Govari |
| 8,932,287 B2 | 1/2015 | Gelbart et al. |
| 8,945,117 B2 | 2/2015 | Bencini |
| 8,979,841 B2 | 3/2015 | Kunis et al. |
| 8,986,278 B2 | 3/2015 | Fung et al. |
| 8,996,091 B2 | 3/2015 | De et al. |
| 9,002,442 B2 | 4/2015 | Harley et al. |
| 9,005,189 B2 | 4/2015 | Davalos et al. |
| 9,005,194 B2 | 4/2015 | Oral et al. |
| 9,011,425 B2 | 4/2015 | Fischer et al. |
| 9,044,245 B2 | 6/2015 | Condie et al. |
| 9,055,959 B2 | 6/2015 | Vaska et al. |
| 9,072,518 B2 | 7/2015 | Swanson |
| 9,078,667 B2 | 7/2015 | Besser et al. |
| 9,101,374 B1 | 8/2015 | Hoch et al. |
| 9,113,911 B2 | 8/2015 | Sherman |
| 9,119,533 B2 | 9/2015 | Ghaffari |
| 9,119,634 B2 | 9/2015 | Gelbart et al. |
| 9,131,897 B2 | 9/2015 | Harada et al. |
| 9,155,590 B2 | 10/2015 | Mathur |
| 9,162,037 B2 | 10/2015 | Belson et al. |
| 9,179,972 B2 | 11/2015 | Olson |
| 9,186,481 B2 | 11/2015 | Avitall et al. |
| 9,192,769 B2 | 11/2015 | Donofrio et al. |
| 9,204,916 B2 | 12/2015 | Lalonde |
| 9,211,405 B2 | 12/2015 | Mahapatra et al. |
| 9,216,055 B2 | 12/2015 | Spence et al. |
| 9,233,248 B2 | 1/2016 | Luther et al. |
| 9,237,926 B2 | 1/2016 | Nollert et al. |
| 9,262,252 B2 | 2/2016 | Kirkpatrick et al. |
| 9,277,957 B2 | 3/2016 | Long et al. |
| 9,282,910 B2 | 3/2016 | Narayan et al. |
| 9,289,258 B2 | 3/2016 | Cohen |
| 9,289,606 B2 | 3/2016 | Paul et al. |
| 9,295,516 B2 | 3/2016 | Pearson et al. |
| 9,301,801 B2 | 4/2016 | Scheib |
| 9,351,789 B2 | 5/2016 | Novichenok et al. |
| 9,375,268 B2 | 6/2016 | Long |
| 9,387,031 B2 | 7/2016 | Stewart et al. |
| 9,414,881 B2 | 8/2016 | Callas et al. |
| 9,468,495 B2 | 10/2016 | Kunis et al. |
| 9,474,486 B2 | 10/2016 | Eliason et al. |
| 9,474,574 B2 | 10/2016 | Ibrahim et al. |
| 9,480,525 B2 | 11/2016 | Lopes et al. |
| 9,486,272 B2 | 11/2016 | Bonyak et al. |
| 9,486,273 B2 | 11/2016 | Lopes et al. |
| 9,492,227 B2 | 11/2016 | Lopes et al. |
| 9,492,228 B2 | 11/2016 | Lopes et al. |
| 9,510,888 B2 | 12/2016 | Lalonde |
| 9,517,103 B2 | 12/2016 | Panescu et al. |
| 9,526,573 B2 | 12/2016 | Opes et al. |
| 9,532,831 B2 | 1/2017 | Reinders et al. |
| 9,539,010 B2 | 1/2017 | Gagner et al. |
| 9,554,848 B2 | 1/2017 | Stewart et al. |
| 9,554,851 B2 | 1/2017 | Sklar et al. |
| 9,700,368 B2 | 7/2017 | Callas et al. |

(56) References Cited

U.S. PATENT DOCUMENTS

| | | |
|---|---|---|
| 9,724,170 B2 | 8/2017 | Mickelsen |
| 9,757,193 B2 | 9/2017 | Zarins et al. |
| 9,782,099 B2 | 10/2017 | Williams et al. |
| 9,795,442 B2 | 10/2017 | Salahieh et al. |
| 9,801,681 B2 | 10/2017 | Laske et al. |
| 9,808,304 B2 | 11/2017 | Lalonde |
| 9,861,802 B2 | 1/2018 | Mickelsen |
| 9,913,685 B2 | 3/2018 | Clark et al. |
| 9,931,487 B2 | 4/2018 | Quinn et al. |
| 9,987,081 B1 | 6/2018 | Bowers et al. |
| 9,999,465 B2 | 6/2018 | Long et al. |
| 10,010,368 B2 | 7/2018 | Laske et al. |
| 10,016,232 B1 | 7/2018 | Bowers et al. |
| 10,130,423 B1 | 11/2018 | Viswanathan et al. |
| 10,172,673 B2 | 1/2019 | Viswanathan et al. |
| 10,194,818 B2 | 2/2019 | Williams et al. |
| 10,285,755 B2 | 5/2019 | Stewart et al. |
| 10,322,286 B2 | 6/2019 | Viswanathan et al. |
| 10,433,906 B2 | 10/2019 | Mickelsen |
| 10,433,908 B2 | 10/2019 | Viswanathan et al. |
| 10,512,505 B2 | 12/2019 | Raju |
| 10,512,779 B2 | 12/2019 | Viswanathan et al. |
| 10,517,672 B2 | 12/2019 | Long |
| 10,617,467 B2 | 4/2020 | Viswanathan et al. |
| 10,660,702 B2 | 5/2020 | Viswanathan et al. |
| 2001/0000791 A1 | 5/2001 | Suorsa et al. |
| 2001/0007070 A1 | 7/2001 | Stewart et al. |
| 2001/0044624 A1 | 11/2001 | Seraj et al. |
| 2002/0022839 A1 | 2/2002 | Stewart et al. |
| 2002/0052602 A1 | 5/2002 | Wang et al. |
| 2002/0058933 A1 | 5/2002 | Christopherson et al. |
| 2002/0077627 A1 | 6/2002 | Johnson et al. |
| 2002/0087169 A1 | 7/2002 | Brock et al. |
| 2002/0091384 A1 | 7/2002 | Hooven et al. |
| 2002/0095176 A1 | 7/2002 | Prestel |
| 2002/0111618 A1 | 8/2002 | Stewart et al. |
| 2002/0156526 A1 | 10/2002 | Hlavka et al. |
| 2002/0161323 A1 | 10/2002 | Miller et al. |
| 2002/0169445 A1 | 11/2002 | Jain et al. |
| 2002/0177765 A1 | 11/2002 | Bowe et al. |
| 2002/0183638 A1 | 12/2002 | Swanson |
| 2003/0014098 A1 | 1/2003 | Quijano et al. |
| 2003/0018374 A1 | 1/2003 | Paulos |
| 2003/0023287 A1 | 1/2003 | Edwards et al. |
| 2003/0028189 A1 | 2/2003 | Woloszko et al. |
| 2003/0050637 A1 | 3/2003 | Maguire et al. |
| 2003/0060856 A1 | 3/2003 | Chornenky et al. |
| 2003/0114849 A1 | 6/2003 | Ryan |
| 2003/0125729 A1 | 7/2003 | Hooven et al. |
| 2003/0130598 A1 | 7/2003 | Manning et al. |
| 2003/0130711 A1 | 7/2003 | Pearson et al. |
| 2003/0204161 A1 | 10/2003 | Ferek-Petric |
| 2003/0229379 A1 | 12/2003 | Maynard |
| 2004/0039382 A1 | 2/2004 | Kroll et al. |
| 2004/0049181 A1 | 3/2004 | Stewart et al. |
| 2004/0049182 A1 | 3/2004 | Koblish et al. |
| 2004/0082859 A1 | 4/2004 | Schaer |
| 2004/0082948 A1 | 4/2004 | Stewart et al. |
| 2004/0087939 A1 | 5/2004 | Eggers et al. |
| 2004/0111087 A1 | 6/2004 | Stern et al. |
| 2004/0199157 A1 | 10/2004 | Palanker et al. |
| 2004/0231683 A1 | 11/2004 | Eng et al. |
| 2004/0236360 A1 | 11/2004 | Cohn et al. |
| 2004/0254607 A1 | 12/2004 | Wittenberger et al. |
| 2004/0267337 A1 | 12/2004 | Hayzelden |
| 2005/0033282 A1 | 2/2005 | Hooven |
| 2005/0187545 A1 | 8/2005 | Hooven et al. |
| 2005/0222632 A1 | 10/2005 | Obino |
| 2005/0251130 A1 | 11/2005 | Boveja et al. |
| 2005/0261672 A1 | 11/2005 | Deem et al. |
| 2006/0009755 A1 | 1/2006 | Sra |
| 2006/0009759 A1 | 1/2006 | Christian et al. |
| 2006/0015095 A1 | 1/2006 | Desinger et al. |
| 2006/0015165 A1 | 1/2006 | Bertolero et al. |
| 2006/0024359 A1 | 2/2006 | Walker et al. |
| 2006/0058781 A1 | 3/2006 | Long |
| 2006/0111702 A1 | 5/2006 | Oral et al. |
| 2006/0142801 A1 | 6/2006 | Demarais et al. |
| 2006/0167448 A1 | 7/2006 | Kozel |
| 2006/0217703 A1 | 9/2006 | Chornenky et al. |
| 2006/0241734 A1 | 10/2006 | Marshall et al. |
| 2006/0264752 A1 | 11/2006 | Rubinsky et al. |
| 2006/0270900 A1 | 11/2006 | Chin et al. |
| 2006/0287648 A1 | 12/2006 | Schwartz |
| 2006/0293730 A1 | 12/2006 | Rubinsky et al. |
| 2006/0293731 A1 | 12/2006 | Rubinsky et al. |
| 2007/0005053 A1 | 1/2007 | Dando |
| 2007/0021744 A1 | 1/2007 | Creighton, IV |
| 2007/0060989 A1 | 3/2007 | Deem et al. |
| 2007/0066972 A1 | 3/2007 | Ormsby et al. |
| 2007/0129721 A1 | 6/2007 | Phan et al. |
| 2007/0129760 A1 | 6/2007 | Demarais et al. |
| 2007/0156135 A1 | 7/2007 | Rubinsky et al. |
| 2007/0167740 A1 | 7/2007 | Grunewald et al. |
| 2007/0167940 A1 | 7/2007 | Stevens-Wright |
| 2007/0173878 A1 | 7/2007 | Heuser |
| 2007/0208329 A1 | 9/2007 | Ward et al. |
| 2007/0225589 A1 | 9/2007 | Viswanathan |
| 2007/0249923 A1 | 10/2007 | Keenan |
| 2007/0260223 A1 | 11/2007 | Scheibe et al. |
| 2007/0270792 A1 | 11/2007 | Hennemann et al. |
| 2008/0009855 A1 | 1/2008 | Hamou |
| 2008/0033426 A1 | 2/2008 | Machell |
| 2008/0065061 A1 | 3/2008 | Viswanathan |
| 2008/0086120 A1 | 4/2008 | Mirza et al. |
| 2008/0091195 A1 | 4/2008 | Sliwa et al. |
| 2008/0103545 A1 | 5/2008 | Bolea et al. |
| 2008/0132885 A1 | 6/2008 | Rubinsky et al. |
| 2008/0161789 A1 | 7/2008 | Thao et al. |
| 2008/0172048 A1 | 7/2008 | Martin et al. |
| 2008/0200913 A1 | 8/2008 | Viswanathan |
| 2008/0208118 A1 | 8/2008 | Goldman |
| 2008/0243214 A1 | 10/2008 | Koblish |
| 2008/0281322 A1 | 11/2008 | Sherman et al. |
| 2008/0300574 A1 | 12/2008 | Belson et al. |
| 2008/0300588 A1 | 12/2008 | Groth et al. |
| 2009/0024084 A1 | 1/2009 | Khosla et al. |
| 2009/0048591 A1 | 2/2009 | Ibrahim et al. |
| 2009/0062788 A1 | 3/2009 | Long et al. |
| 2009/0076496 A1 | 3/2009 | Azure |
| 2009/0076500 A1 | 3/2009 | Azure |
| 2009/0105654 A1 | 4/2009 | Kurth et al. |
| 2009/0138009 A1 | 5/2009 | Viswanathan et al. |
| 2009/0149917 A1 | 6/2009 | Whitehurst et al. |
| 2009/0163905 A1 | 6/2009 | Winkler et al. |
| 2009/0228003 A1 | 9/2009 | Sinelnikov |
| 2009/0240248 A1 | 9/2009 | Deford et al. |
| 2009/0275827 A1 | 11/2009 | Aiken et al. |
| 2009/0281477 A1 | 11/2009 | Mikus et al. |
| 2009/0306651 A1 | 12/2009 | Schneider |
| 2010/0004623 A1 | 1/2010 | Hamilton et al. |
| 2010/0023004 A1 | 1/2010 | Francischelli et al. |
| 2010/0137861 A1 | 6/2010 | Soroff et al. |
| 2010/0185140 A1 | 7/2010 | Kassab et al. |
| 2010/0185186 A1 | 7/2010 | Longoria |
| 2010/0191112 A1 | 7/2010 | Demarais et al. |
| 2010/0191232 A1 | 7/2010 | Boveda |
| 2010/0241185 A1 | 9/2010 | Mahapatra et al. |
| 2010/0261994 A1 | 10/2010 | Davalos et al. |
| 2010/0274238 A1 | 10/2010 | Klimovitch |
| 2010/0280513 A1 | 11/2010 | Juergen et al. |
| 2010/0280539 A1 | 11/2010 | Miyoshi et al. |
| 2010/0292687 A1 | 11/2010 | Kauphusman et al. |
| 2010/0312096 A1 | 12/2010 | Guttman et al. |
| 2010/0312300 A1 | 12/2010 | Ryu et al. |
| 2011/0028962 A1 | 2/2011 | Werneth et al. |
| 2011/0028964 A1 | 2/2011 | Edwards |
| 2011/0040199 A1 | 2/2011 | Hopenfeld |
| 2011/0098694 A1 | 4/2011 | Long |
| 2011/0106221 A1 | 5/2011 | Neal et al. |
| 2011/0130708 A1 | 6/2011 | Perry et al. |
| 2011/0144524 A1 | 6/2011 | Fish et al. |
| 2011/0144633 A1 | 6/2011 | Govari |
| 2011/0160785 A1 | 6/2011 | Mori et al. |

(56) References Cited

U.S. PATENT DOCUMENTS

| | | |
|---|---|---|
| 2011/0190659 A1 | 8/2011 | Long et al. |
| 2011/0190727 A1 | 8/2011 | Edmunds et al. |
| 2011/0213231 A1 | 9/2011 | Hall et al. |
| 2011/0276047 A1 | 11/2011 | Sklar et al. |
| 2011/0276075 A1 | 11/2011 | Fung et al. |
| 2011/0288544 A1 | 11/2011 | Verin et al. |
| 2011/0288547 A1 | 11/2011 | Morgan et al. |
| 2011/0313417 A1 | 12/2011 | De et al. |
| 2012/0029512 A1 | 2/2012 | Willard et al. |
| 2012/0046570 A1 | 2/2012 | Villegas et al. |
| 2012/0053581 A1 | 3/2012 | Wittkampf et al. |
| 2012/0059255 A1 | 3/2012 | Paul et al. |
| 2012/0071872 A1 | 3/2012 | Rubinsky et al. |
| 2012/0078320 A1 | 3/2012 | Schotzko et al. |
| 2012/0078343 A1 | 3/2012 | Fish |
| 2012/0089089 A1 | 4/2012 | Swain et al. |
| 2012/0095459 A1 | 4/2012 | Callas et al. |
| 2012/0101413 A1 | 4/2012 | Beetel et al. |
| 2012/0158021 A1 | 6/2012 | Morrill |
| 2012/0165667 A1 | 6/2012 | Altmann et al. |
| 2012/0172859 A1 | 7/2012 | Condie et al. |
| 2012/0172867 A1 | 7/2012 | Ryu et al. |
| 2012/0197100 A1 | 8/2012 | Razavi et al. |
| 2012/0209260 A1 | 8/2012 | Lambert et al. |
| 2012/0220998 A1 | 8/2012 | Long et al. |
| 2012/0265198 A1 | 10/2012 | Crow et al. |
| 2012/0283582 A1 | 11/2012 | Mahapatra et al. |
| 2012/0303019 A1 | 11/2012 | Zhao et al. |
| 2012/0310052 A1 | 12/2012 | Mahapatra et al. |
| 2012/0310230 A1 | 12/2012 | Willis |
| 2012/0310237 A1 | 12/2012 | Swanson |
| 2012/0316557 A1 | 12/2012 | Sartor et al. |
| 2013/0030430 A1 | 1/2013 | Stewart et al. |
| 2013/0060247 A1 | 3/2013 | Sklar et al. |
| 2013/0060248 A1 | 3/2013 | Sklar et al. |
| 2013/0079768 A1 | 3/2013 | De et al. |
| 2013/0090651 A1 | 4/2013 | Smith |
| 2013/0096655 A1 | 4/2013 | Moffitt et al. |
| 2013/0103027 A1 | 4/2013 | Sklar et al. |
| 2013/0103064 A1 | 4/2013 | Arenson et al. |
| 2013/0131662 A1 | 5/2013 | Wittkampf |
| 2013/0158538 A1 | 6/2013 | Govari |
| 2013/0158621 A1 | 6/2013 | Ding et al. |
| 2013/0172715 A1 | 7/2013 | Just et al. |
| 2013/0172864 A1 | 7/2013 | Ibrahim et al. |
| 2013/0172875 A1 | 7/2013 | Govari et al. |
| 2013/0184702 A1 | 7/2013 | Neal et al. |
| 2013/0218157 A1 | 8/2013 | Callas et al. |
| 2013/0226174 A1 | 8/2013 | Ibrahim et al. |
| 2013/0237984 A1 | 9/2013 | Sklar |
| 2013/0253415 A1 | 9/2013 | Sano et al. |
| 2013/0296679 A1 | 11/2013 | Condie et al. |
| 2013/0310829 A1 | 11/2013 | Cohen |
| 2013/0317385 A1 | 11/2013 | Sklar et al. |
| 2013/0331831 A1 | 12/2013 | Werneth et al. |
| 2013/0338467 A1 | 12/2013 | Grasse et al. |
| 2014/0005664 A1 | 1/2014 | Govari et al. |
| 2014/0024911 A1 | 1/2014 | Harlev et al. |
| 2014/0039288 A1 | 2/2014 | Hue-Teh |
| 2014/0051993 A1 | 2/2014 | Mcgee |
| 2014/0052118 A1 | 2/2014 | Laske et al. |
| 2014/0052126 A1 | 2/2014 | Long et al. |
| 2014/0052216 A1 | 2/2014 | Long et al. |
| 2014/0058377 A1 | 2/2014 | Deem et al. |
| 2014/0081113 A1 | 3/2014 | Cohen et al. |
| 2014/0100563 A1 | 4/2014 | Govari et al. |
| 2014/0107644 A1 | 4/2014 | Falwell et al. |
| 2014/0142408 A1 | 5/2014 | De et al. |
| 2014/0148804 A1 | 5/2014 | Ward et al. |
| 2014/0163480 A1 | 6/2014 | Govari et al. |
| 2014/0163546 A1 | 6/2014 | Govari et al. |
| 2014/0171942 A1 | 6/2014 | Werneth et al. |
| 2014/0180035 A1 | 6/2014 | Anderson |
| 2014/0187916 A1 | 7/2014 | Clark et al. |
| 2014/0194716 A1 | 7/2014 | Diep et al. |
| 2014/0194867 A1 | 7/2014 | Fish et al. |
| 2014/0200567 A1 | 7/2014 | Cox et al. |
| 2014/0235986 A1 | 8/2014 | Harlev et al. |
| 2014/0235988 A1 | 8/2014 | Ghosh |
| 2014/0235989 A1 | 8/2014 | Wodlinger et al. |
| 2014/0243851 A1 | 8/2014 | Cohen et al. |
| 2014/0253140 A1 | 9/2014 | Gilbert |
| 2014/0276760 A1 | 9/2014 | Bonyak et al. |
| 2014/0276782 A1 | 9/2014 | Paskar |
| 2014/0276791 A1 | 9/2014 | Ku et al. |
| 2014/0288556 A1 | 9/2014 | Ibrahim et al. |
| 2014/0303721 A1 | 10/2014 | Fung et al. |
| 2014/0343549 A1 | 11/2014 | Spear et al. |
| 2014/0364845 A1 | 12/2014 | Rashidi |
| 2014/0371613 A1 | 12/2014 | Narayan et al. |
| 2015/0005767 A1 | 1/2015 | Werneth et al. |
| 2015/0011995 A1 | 1/2015 | Avitall et al. |
| 2015/0066108 A1 | 3/2015 | Shi et al. |
| 2015/0119674 A1 | 4/2015 | Fischell et al. |
| 2015/0126840 A1 | 5/2015 | Thakur et al. |
| 2015/0133914 A1 | 5/2015 | Koblish |
| 2015/0138977 A1 | 5/2015 | Dacosta |
| 2015/0141978 A1 | 5/2015 | Subramaniam et al. |
| 2015/0141982 A1 | 5/2015 | Lee |
| 2015/0142041 A1 | 5/2015 | Kendale et al. |
| 2015/0148796 A1 | 5/2015 | Bencini |
| 2015/0150472 A1 | 6/2015 | Harlev et al. |
| 2015/0157402 A1 | 6/2015 | Kunis et al. |
| 2015/0157412 A1 | 6/2015 | Wallace et al. |
| 2015/0164584 A1 | 6/2015 | Davalos et al. |
| 2015/0173824 A1 | 6/2015 | Davalos et al. |
| 2015/0173828 A1 | 6/2015 | Avitall |
| 2015/0174404 A1 | 6/2015 | Rousso et al. |
| 2015/0182740 A1 | 7/2015 | Mickelsen |
| 2015/0196217 A1 | 7/2015 | Harlev et al. |
| 2015/0223726 A1 | 8/2015 | Harlev et al. |
| 2015/0230699 A1 | 8/2015 | Berul et al. |
| 2015/0258344 A1 | 9/2015 | Tandri et al. |
| 2015/0265342 A1 | 9/2015 | Long et al. |
| 2015/0265344 A1 | 9/2015 | Aktas et al. |
| 2015/0272656 A1 | 10/2015 | Chen |
| 2015/0272664 A9 | 10/2015 | Cohen |
| 2015/0272667 A1 | 10/2015 | Govari et al. |
| 2015/0282729 A1 | 10/2015 | Harlev et al. |
| 2015/0289923 A1 | 10/2015 | Davalos et al. |
| 2015/0304879 A1 | 10/2015 | Dacosta |
| 2015/0320481 A1 | 11/2015 | Cosman et al. |
| 2015/0321021 A1 | 11/2015 | Tandri et al. |
| 2015/0342532 A1 | 12/2015 | Basu et al. |
| 2015/0343212 A1 | 12/2015 | Rousso et al. |
| 2015/0351836 A1 | 12/2015 | Prutchi |
| 2015/0359583 A1 | 12/2015 | Swanson |
| 2016/0000500 A1 | 1/2016 | Salahieh et al. |
| 2016/0008061 A1 | 1/2016 | Fung et al. |
| 2016/0008065 A1 | 1/2016 | Gliner et al. |
| 2016/0029960 A1 | 2/2016 | Toth et al. |
| 2016/0038772 A1 | 2/2016 | Thapliyal et al. |
| 2016/0051204 A1 | 2/2016 | Harlev et al. |
| 2016/0051324 A1 | 2/2016 | Stewart et al. |
| 2016/0058493 A1 | 3/2016 | Neal et al. |
| 2016/0058506 A1 | 3/2016 | Spence et al. |
| 2016/0066993 A1 | 3/2016 | Avitall et al. |
| 2016/0074679 A1 | 3/2016 | Thapliyal et al. |
| 2016/0095531 A1 | 4/2016 | Narayan et al. |
| 2016/0095642 A1 | 4/2016 | Deno et al. |
| 2016/0095653 A1 | 4/2016 | Lambert et al. |
| 2016/0100797 A1 | 4/2016 | Mahapatra et al. |
| 2016/0100884 A1 | 4/2016 | Fay et al. |
| 2016/0106498 A1 | 4/2016 | Highsmith et al. |
| 2016/0106500 A1 | 4/2016 | Olson |
| 2016/0113709 A1 | 4/2016 | Maor |
| 2016/0113712 A1 | 4/2016 | Cheung et al. |
| 2016/0120564 A1 | 5/2016 | Kirkpatrick et al. |
| 2016/0128770 A1 | 5/2016 | Afonso et al. |
| 2016/0166167 A1 | 6/2016 | Narayan et al. |
| 2016/0166310 A1 | 6/2016 | Stewart et al. |
| 2016/0166311 A1 | 6/2016 | Long et al. |
| 2016/0174865 A1 | 6/2016 | Stewart et al. |
| 2016/0183877 A1 | 6/2016 | Williams et al. |

(56) References Cited

U.S. PATENT DOCUMENTS

| | | |
|---|---|---|
| 2016/0184003 A1 | 6/2016 | Srimathveeravalli et al. |
| 2016/0184004 A1 | 6/2016 | Hull et al. |
| 2016/0213282 A1 | 7/2016 | Leo et al. |
| 2016/0220307 A1 | 8/2016 | Miller et al. |
| 2016/0235470 A1 | 8/2016 | Callas et al. |
| 2016/0249972 A1 | 9/2016 | Klink |
| 2016/0256682 A1 | 9/2016 | Paul et al. |
| 2016/0287314 A1 | 10/2016 | Arena et al. |
| 2016/0310211 A1 | 10/2016 | Long |
| 2016/0324564 A1 | 11/2016 | Gerlach et al. |
| 2016/0324573 A1 | 11/2016 | Mickelson et al. |
| 2016/0331441 A1 | 11/2016 | Konings |
| 2016/0331459 A1 | 11/2016 | Townley et al. |
| 2016/0338770 A1 | 11/2016 | Bar-Tal et al. |
| 2016/0354142 A1 | 12/2016 | Pearson et al. |
| 2016/0361109 A1 | 12/2016 | Weaver et al. |
| 2017/0001016 A1 | 1/2017 | De Ridder |
| 2017/0035499 A1 | 2/2017 | Stewart et al. |
| 2017/0042449 A1 | 2/2017 | Deno et al. |
| 2017/0042615 A1 | 2/2017 | Salahieh et al. |
| 2017/0056648 A1 | 3/2017 | Syed et al. |
| 2017/0065330 A1 | 3/2017 | Mickelson et al. |
| 2017/0065339 A1 | 3/2017 | Mickelson |
| 2017/0065340 A1 | 3/2017 | Long |
| 2017/0065343 A1 | 3/2017 | Mickelson |
| 2017/0071543 A1 | 3/2017 | Basu et al. |
| 2017/0095291 A1 | 4/2017 | Harrington et al. |
| 2017/0105793 A1 | 4/2017 | Cao et al. |
| 2017/0120048 A1 | 5/2017 | He et al. |
| 2017/0146584 A1 | 5/2017 | Daw et al. |
| 2017/0151014 A1 | 6/2017 | Perfler |
| 2017/0151029 A1 | 6/2017 | Mickelson |
| 2017/0172654 A1 | 6/2017 | Wittkampf et al. |
| 2017/0181795 A1 | 6/2017 | Debruyne |
| 2017/0189097 A1 | 7/2017 | Viswanathan et al. |
| 2017/0215953 A1 | 8/2017 | Long et al. |
| 2017/0245928 A1 | 8/2017 | Xiao et al. |
| 2017/0246455 A1 | 8/2017 | Athos et al. |
| 2017/0312024 A1 | 11/2017 | Harlev et al. |
| 2017/0312025 A1 | 11/2017 | Harlev et al. |
| 2017/0312027 A1 | 11/2017 | Harlev et al. |
| 2017/0312420 A1* | 11/2017 | Harlev ............. A61B 18/1206 |
| 2018/0001056 A1 | 1/2018 | Leeflang et al. |
| 2018/0028252 A1 | 2/2018 | Lalonde |
| 2018/0042674 A1 | 2/2018 | Mickelson |
| 2018/0042675 A1 | 2/2018 | Long |
| 2018/0043153 A1 | 2/2018 | Viswanathan et al. |
| 2018/0064488 A1 | 3/2018 | Long et al. |
| 2018/0085160 A1 | 3/2018 | Viswanathan et al. |
| 2018/0093088 A1 | 4/2018 | Mickelson |
| 2018/0133460 A1 | 5/2018 | Townley et al. |
| 2018/0161093 A1 | 6/2018 | Basu et al. |
| 2018/0168511 A1 | 6/2018 | Hall et al. |
| 2018/0184982 A1 | 7/2018 | Basu et al. |
| 2018/0193090 A1 | 7/2018 | De et al. |
| 2018/0200497 A1 | 7/2018 | Mickelson |
| 2018/0228534 A1* | 8/2018 | Govari ................. A61N 1/056 |
| 2018/0235496 A1 | 8/2018 | Wu et al. |
| 2018/0256109 A1 | 9/2018 | Wu et al. |
| 2018/0280080 A1 | 10/2018 | Govari et al. |
| 2018/0303488 A1 | 10/2018 | Hill |
| 2018/0303543 A1 | 10/2018 | Stewart et al. |
| 2018/0311497 A1 | 11/2018 | Viswanathan et al. |
| 2018/0344202 A1 | 12/2018 | Bar-Tal et al. |
| 2018/0344393 A1 | 12/2018 | Gruba et al. |
| 2018/0360531 A1 | 12/2018 | Holmes et al. |
| 2018/0360534 A1 | 12/2018 | Teplitsky et al. |
| 2019/0015007 A1 | 1/2019 | Rottmann et al. |
| 2019/0015638 A1 | 1/2019 | Gruba et al. |
| 2019/0030328 A1 | 1/2019 | Stewart et al. |
| 2019/0046791 A1 | 2/2019 | Ebbers et al. |
| 2019/0069949 A1 | 3/2019 | Vrba et al. |
| 2019/0069950 A1 | 3/2019 | Viswanathan et al. |
| 2019/0076179 A1 | 3/2019 | Babkin et al. |
| 2019/0125439 A1 | 5/2019 | Rohl et al. |
| 2019/0125788 A1 | 5/2019 | Gruba et al. |
| 2019/0143106 A1 | 5/2019 | Dewitt et al. |
| 2019/0151015 A1 | 5/2019 | Viswanathan et al. |
| 2019/0175263 A1 | 6/2019 | Altmann et al. |
| 2019/0183378 A1 | 6/2019 | Mosesov et al. |
| 2019/0183567 A1 | 6/2019 | Govari et al. |
| 2019/0192223 A1 | 6/2019 | Rankin |
| 2019/0201089 A1 | 7/2019 | Waldstreicher et al. |
| 2019/0201688 A1 | 7/2019 | Olson |
| 2019/0209235 A1 | 7/2019 | Stewart et al. |
| 2019/0223948 A1 | 7/2019 | Stewart et al. |
| 2019/0231421 A1 | 8/2019 | Viswanathan et al. |
| 2019/0231425 A1 | 8/2019 | Waldstreicher et al. |
| 2019/0254735 A1 | 8/2019 | Stewart et al. |
| 2019/0269912 A1 | 9/2019 | Viswanathan et al. |
| 2019/0298442 A1 | 10/2019 | Ogata et al. |
| 2019/0307500 A1 | 10/2019 | Byrd et al. |
| 2019/0343580 A1* | 11/2019 | Nguyen ............ A61B 18/1492 |
| 2019/0350647 A1 | 11/2019 | Ramberg et al. |
| 2019/0350649 A1 | 11/2019 | Sutermeister et al. |
| 2020/0008869 A1 | 1/2020 | Byrd |
| 2020/0008870 A1 | 1/2020 | Gruba et al. |
| 2020/0009378 A1 | 1/2020 | Stewart et al. |
| 2020/0038104 A1 | 2/2020 | Mickelsen |
| 2020/0046423 A1 | 2/2020 | Viswanathan et al. |
| 2020/0093539 A1 | 3/2020 | Long et al. |
| 2022/0133405 A1 | 5/2022 | Mickelsen |

FOREIGN PATENT DOCUMENTS

| | | |
|---|---|---|
| EP | 1125549 A2 | 8/2001 |
| EP | 0797956 B1 | 6/2003 |
| EP | 1340469 A1 | 9/2003 |
| EP | 1127552 B1 | 6/2006 |
| EP | 1803411 A2 | 7/2007 |
| EP | 1009303 B1 | 6/2009 |
| EP | 2213729 A2 | 8/2010 |
| EP | 2382935 A1 | 11/2011 |
| EP | 2425871 A2 | 3/2012 |
| EP | 2532320 A2 | 12/2012 |
| EP | 2587275 A1 | 5/2013 |
| EP | 2663227 A1 | 11/2013 |
| EP | 1909678 B1 | 1/2014 |
| EP | 2217165 B1 | 3/2014 |
| EP | 2376193 B1 | 3/2014 |
| EP | 2708181 A1 | 3/2014 |
| EP | 2777579 A1 | 9/2014 |
| EP | 2777585 A1 | 9/2014 |
| EP | 2934307 A1 | 10/2015 |
| EP | 3056242 A1 | 8/2016 |
| EP | 3111871 A1 | 1/2017 |
| EP | 3151773 B1 | 4/2018 |
| JP | 06-507797 A | 9/1994 |
| JP | 2000-508196 A | 7/2000 |
| JP | 2005-516666 A | 6/2005 |
| JP | 2006-506184 A | 2/2006 |
| JP | 2008-538997 A | 11/2008 |
| JP | 2009-500129 A | 1/2009 |
| JP | 2010-012145 A | 1/2010 |
| JP | 2011-509158 A | 3/2011 |
| JP | 2012-050538 A | 3/2012 |
| JP | 2018-130545 A | 8/2018 |
| JP | 2020-503144 A | 1/2020 |
| JP | 2020-517355 A | 6/2020 |
| WO | 92/07622 A1 | 5/1992 |
| WO | 92/21278 A1 | 12/1992 |
| WO | 92/21285 A1 | 12/1992 |
| WO | 94/07413 A1 | 4/1994 |
| WO | 97/24073 A1 | 7/1997 |
| WO | 97/25917 A1 | 7/1997 |
| WO | 97/37719 A1 | 10/1997 |
| WO | 99/04851 A1 | 2/1999 |
| WO | 99/22659 A1 | 5/1999 |
| WO | 99/56650 A1 | 11/1999 |
| WO | 99/59486 A2 | 11/1999 |
| WO | 02/56782 A2 | 7/2002 |
| WO | 03/53289 A1 | 7/2003 |
| WO | 03/65916 A1 | 8/2003 |
| WO | 2004/045442 A1 | 6/2004 |

(56) References Cited

FOREIGN PATENT DOCUMENTS

| | | |
|---|---|---|
| WO | 2004/086994 A1 | 10/2004 |
| WO | 2005/046487 A1 | 5/2005 |
| WO | 2006/115902 A2 | 11/2006 |
| WO | 2007/006055 A2 | 1/2007 |
| WO | 2007/079438 A2 | 7/2007 |
| WO | 2009/082710 A1 | 7/2009 |
| WO | 2009/089343 A1 | 7/2009 |
| WO | 2009/137800 A2 | 11/2009 |
| WO | 2010/014480 A1 | 2/2010 |
| WO | 2011/028310 A1 | 3/2011 |
| WO | 2011/154805 A1 | 12/2011 |
| WO | 2012/051433 A2 | 4/2012 |
| WO | 2012/097067 A1 | 7/2012 |
| WO | 2012/153928 A2 | 11/2012 |
| WO | 2013/019385 A1 | 2/2013 |
| WO | 2014/025394 A1 | 2/2014 |
| WO | 2014/031800 A1 | 2/2014 |
| WO | 2014/036439 A2 | 3/2014 |
| WO | 2014/100579 A1 | 6/2014 |
| WO | 2014/160832 A2 | 10/2014 |
| WO | 2015/066322 A1 | 5/2015 |
| WO | 2015/099786 A1 | 7/2015 |
| WO | 2015/103530 A1 | 7/2015 |
| WO | 2015/103574 A1 | 7/2015 |
| WO | 2015/130824 A1 | 9/2015 |
| WO | 2015/140741 A1 | 9/2015 |
| WO | 2015/143327 A1 | 9/2015 |
| WO | 2015/171921 A2 | 11/2015 |
| WO | 2015/175944 A1 | 11/2015 |
| WO | 2015/192018 A1 | 12/2015 |
| WO | 2015/192027 A1 | 12/2015 |
| WO | 2016/059027 A1 | 4/2016 |
| WO | 2016/060983 A1 | 4/2016 |
| WO | 2016/081650 A1 | 5/2016 |
| WO | 2016/090175 A1 | 6/2016 |
| WO | 2017/093926 A1 | 6/2017 |
| WO | 2017/119934 A1 | 7/2017 |
| WO | 2017/120169 A1 | 7/2017 |
| WO | 2017/192477 A1 | 11/2017 |
| WO | 2017/192495 A1 | 11/2017 |
| WO | 2017/201504 A1 | 11/2017 |
| WO | 2017/218734 A1 | 12/2017 |
| WO | 2018/005511 A1 | 1/2018 |
| WO | 2018/106569 A1 | 6/2018 |
| WO | 2018/200800 A1 | 11/2018 |
| WO | 2019/023259 A2 | 1/2019 |
| WO | 2019/023280 A1 | 1/2019 |
| WO | 2019/035071 A1 | 2/2019 |
| WO | 2019/133606 A1 | 7/2019 |
| WO | 2019/133608 A1 | 7/2019 |
| WO | 2019/136218 A1 | 7/2019 |
| WO | 2019/181612 A1 | 9/2019 |
| WO | 2019/234133 A1 | 12/2019 |

OTHER PUBLICATIONS

Du Pre, B.C. et al., "Minimal coronary artery damage by myocardial electroporation ablation," Europace, 15(1):144-149 (2013).

Hobbs, E. P., "Investor Relations Update: Tissue Ablation via Irreversible Electroporation (IRE)," Powerpoint (2004), 16 pages.

International Search Report and Written Opinion received for PCT Patent Application No. PCT/US2021/049410, mailed on Mar. 14, 2022, 17 pages.

Lavee, J. et al., "A Novel Nonthermal Energy Source for Surgical Epicardial Atrial Ablation: Irreversible Electroporation," The Heart Surgery Forum #2006-1202, 10(2), 2007 [Epub Mar. 2007].

Madhavan, M. et al., "Novel Percutaneous Epicardial Autonomic Modulation in the Canine for Atrial Fibrillation: Results of an Efficacy and Safety Study," Pace, 00:1-11 (2016).

Neven, K. et al., "Epicardial linear electroporation ablation and lesion size," Heart Rhythm, 11:1465-1470 (2014).

Neven, K. et al., "Myocardial Lesion Size After Epicardial Electroporation Catheter Ablation After Subxiphoid Puncture," Circ Arrhythm Electrophysiol., 7(4):728-733 (2014).

Neven, K. et al., "Safety and Feasibility of Closed Chest Epicardial Catheter Ablation Using Electroporation," Circ Arrhythm Electrophysiol., 7:913-919 (2014).

Van Driel, V.J.H.M. et al., "Low vulnerability of the right phrenic nerve to electroporation ablation," Heart Rhythm, 12:1838-1844 (2015).

Van Driel, V.J.H.M. et al., "Pulmonary Vein Stenosis After Catheter Ablation Electroporation Versus Radiofrequency," Circ Arrhythm Electrophysiol., 7(4):734-738 (2014).

Wittkampf, F.H. et al., "Feasibility of Electroporation for the Creation of Pulmonary Vein Ostial Lesions," J Cardiovasc Electrophysiol, 22(3):302-309 (Mar. 2011).

Wittkampf, F.H. et al., "Myocardial Lesion Depth With Circular Electroporation Ablation," Circ. Arrhythm Electrophysiol., 5(3):581-586 (2012).

\* cited by examiner

1000

1301

FIG. 15A
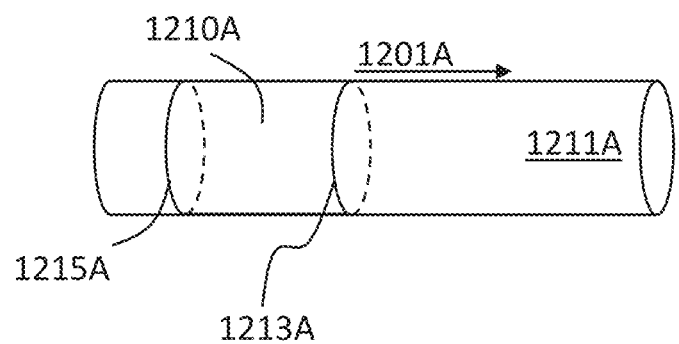
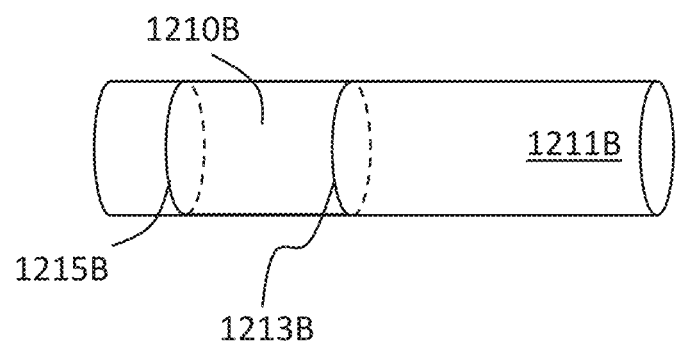

FIG. 15B
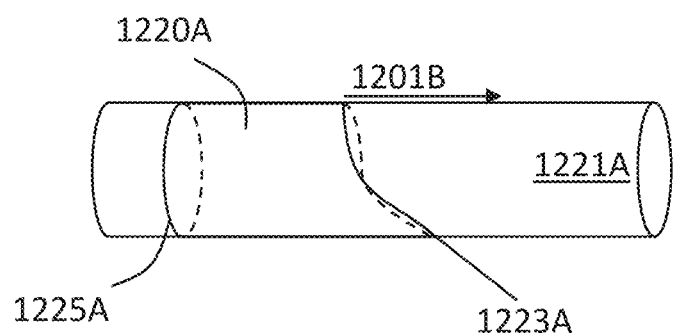
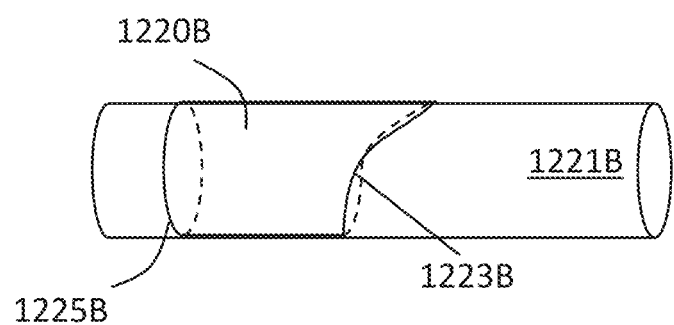

CONTOURED ELECTRODES FOR PULSED ELECTRIC FIELD ABLATION, AND SYSTEMS, DEVICES, AND METHODS THEREOF

CROSS-REFERENCE TO RELATED APPLICATIONS

This application claims priority to U.S. Provisional Patent Application No. 63/075,729, filed on Sep. 8, 2020, the entire disclosure of which is incorporated herein by reference in its entirety.

TECHNICAL FIELD

The embodiments described herein relate generally to medical devices for therapeutic electrical energy delivery, and more particularly to systems, apparatuses, and methods for tissue ablation devices (e.g., ablation catheters) having contoured electrodes and generating pulse electric fields using such devices.

BACKGROUND

Pulsed field ablation using application of high voltage pulses has been demonstrated to be suitable for the rapid and effective ablation of cardiac tissue as well as other target anatomy. In the cardiac context, pulsed field ablation may generate locally high electric fields configured to drive irreversible electroporation (e.g., breakdown cell membranes resulting in cell death). For example, an ablation catheter configured for focal ablation can be used to delivered pulsed field ablation via irreversible electroporation to cardiac tissue. However, high voltage pulses within a fluid medium (e.g., blood) may result in electrolysis and/or associated generation of bubbles. For example, an electric field near an edge of an electrode may be large enough to drive electrical breakdown in gas bubbles and generate local flash arcing. Associated high current densities at an electrode edge can also result in relatively larger bubble sizes. Bubbles and flash arcing are undesirable in the context of clinical applications including cardiac tissue ablation.

SUMMARY

Described herein are systems, devices, and methods for ablating tissue through irreversible electroporation. In some embodiments, an apparatus includes a first shaft defining a longitudinal axis and a lumen; a second shaft disposed within the lumen and having a distal portion that extends from a distal end of the first shaft; a plurality of electrodes configured to generate an electric field for ablating tissue; and a set of splines, each spline of the set of splines including a set of electrodes of the plurality of electrodes formed on that spline, each set of electrodes including a contoured electrode, each contoured electrode including: a proximal edge and a distal edge, at least one of the proximal edge or the distal edge being a contoured edge, the contoured edge having at least one concave portion or convex portion, the set of splines configured to transition into an expanded configuration in which the set of splines bow radially outward from the longitudinal axis of the first shaft.

In some embodiments, an apparatus includes a linear shaft defining a longitudinal axis; and a plurality of electrodes disposed on a distal portion of the linear shaft, the plurality of electrodes configured to generate an electric field for ablating tissue, the plurality of electrodes including: a tip electrode disposed at a distal end of the linear shaft, the tip electrode including a first contoured edge; and a set of proximal electrodes disposed proximal of the tip electrode, the set of proximal electrodes including a contoured electrode having a second contoured edge, the first and second contoured edges each having at least one concave portion or convex portion.

In some embodiments, a method includes generating a pulse waveform using a signal generator that is coupled to an ablation device, the ablation device including a plurality of electrodes disposed on a distal portion of the ablation device, the distal portion of the ablation device being positioned within a heart of a patient; and delivering the pulse waveform to a set of electrodes of the plurality of electrodes such that subsets of the set of electrodes are energized with opposite polarities to generate a pulsed electric field to ablate tissue near the distal portion of the ablation device, the set of electrodes including at least one contoured electrode disposed on a flexible member of the ablation device, each contoured electrode having a contoured edge that reduces (1) an intensity of the electric field at an interface between the contoured edge and the flexible member and (2) a drop-off in the intensity in a direction extending away from the contoured edge.

BRIEF DESCRIPTION OF THE DRAWINGS

FIGS. 15A and 15B are schematic side views of splines or shafts of an ablation device without and with a contoured electrode, respectively, according to embodiments.

DETAILED DESCRIPTION

Figure 1:
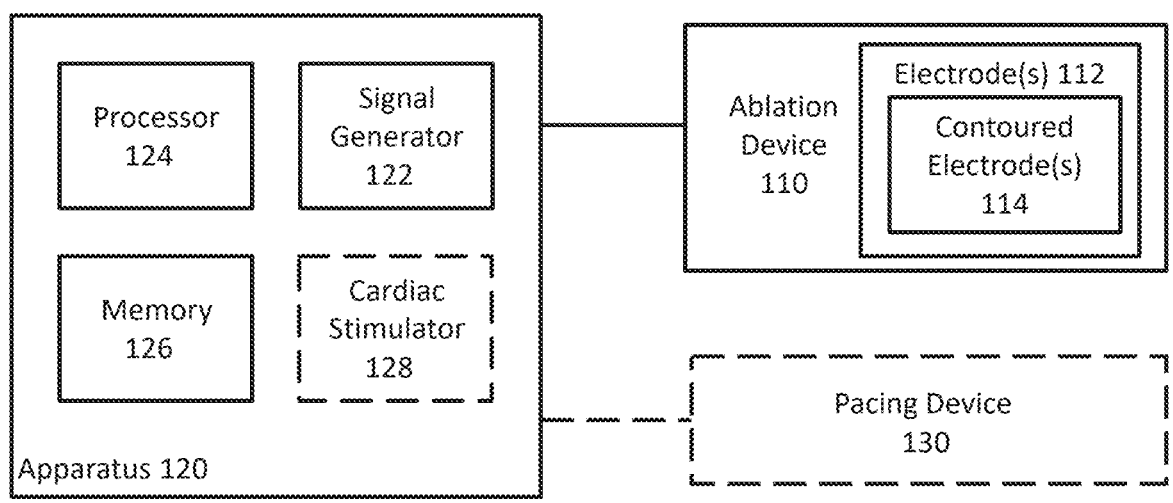
FIG. 1 is a block diagram of a system for ablation, according to embodiments.

Described herein are systems, devices, and methods for delivering pulsed electric fields to ablate tissue by irreversible electroporation. In some embodiments, the systems, devices, and methods described herein may be used to generate pulsed electric fields with improved (e.g., reduced) local fields and current densities at electrode edges, e.g., by suitable contouring of electrode edges as described herein. Systems, devices, and methods disclosed herein can generate a local electric field in a tissue region sufficient to drive irreversible electroporation while maintaining electric field values below a safe level in a predetermined tissue region.

The term "electroporation" as used herein refers to the application of an electric field to a cell membrane to change the permeability of the cell membrane to the extracellular environment. The term "reversible electroporation" as used herein refers to the application of an electric field to a cell membrane to temporarily change the permeability of the cell membrane to the extracellular environment. For example, a cell undergoing reversible electroporation can observe the temporary and/or intermittent formation of one or more pores in its cell membrane that close upon removal of the electric field. The term "irreversible electroporation" as used herein refers to the application of an electric field to a cell membrane to permanently change the permeability of the cell membrane to the extracellular environment. For example, a cell undergoing irreversible electroporation can observe the formation of one or more pores in its cell membrane that persist upon removal of the electric field.

In some embodiments, an electrode is configured to produce an electric field having an improved spatial uniformity. For example, an ablation device may include a set of contoured electrodes. In some embodiments, an ablation device including a catheter shaft may include one or more of the electrodes described herein. In some embodiments, a linear catheter ablation device may include a catheter shaft and a distal cap. The distal cap may include one or more distal cap electrodes corresponding to any of the electrodes described herein. In some embodiments, catheter devices for cardiac ablation can be made with electrodes in the form of cylindrical rings mounted on a catheter shaft made of a polymeric material. In some embodiments, a balloon ablation device or other ablation device having an expandable structure may have a distally located inflatable balloon or expandable structure with contoured electrodes formed on the balloon or expandable structure.

Systems

Disclosed herein are systems and devices configured for generating ablating tissue. Generally, a system described here for ablating tissue with high voltage pulse waveforms. The systems, methods and implementations described in the present disclosure apply to synchronous or asynchronous ablation delivery. Furthermore, as described herein, the systems and devices may be deployed endocardially and/or epicardially to treat cardiac arrhythmias.

Disclosed herein are systems and devices configured for tissue ablation via the selective and rapid application of voltage pulse waveforms to aid tissue ablation, resulting in irreversible electroporation. Generally, a system for ablating tissue described here may include a signal generator and an ablation device having one or more electrodes for the selective and rapid application of direct current (DC) voltage to drive electroporation. As described herein, the systems and devices may be deployed epicardially and/or endocardially to treat cardiac arrhythmias. Voltages may be applied to selected paired subsets of the electrodes, with independent subset selections for anode and cathode electrode selections in order to deliver pulsed electric field ablation therapy. In embodiments, the paired electrode subsets can be predetermined. In some embodiments, a pacing signal for cardiac stimulation may be generated and used to deliver the ablation pulse waveform by the signal generator in synchronization with the pacing signal.

Generally, the systems and devices described herein include one or more catheters configured to ablate tissue in a heart (e.g., a left atrial chamber of a heart). The catheter can include an electrode having at least one edge having a contour including convex and concave portions. In some embodiments, one or more electrodes can be embodied as a ring electrode on a catheter shaft. In some embodiments, one or more electrodes can be embodied in other forms, e.g., including the distal cap electrode of a linear catheter ablation device.

FIG. 1 illustrates an ablation system 100 configured to deliver voltage pulse waveforms. The system 100 may include an apparatus 120 including a signal generator 122, a processor 124, and a memory 126, and optionally a cardiac stimulator 128. The apparatus 120 may be coupled to an ablation device 110 and optionally to a pacing device 130.

The signal generator 122 may be configured to generate pulse waveforms for irreversible electroporation of tissue, such as, for example, pulmonary vein ostia. For example, the signal generator 122 may be a voltage pulse waveform generator and deliver a pulse waveform to the ablation device 110. The processor 124 may incorporate data received from memory 126 to determine the parameters (e.g., amplitude, width, duty cycle, etc.) of the pulse waveform to be generated by the signal generator 122. The memory 126 may further store instructions to cause the signal generator 122 to execute modules, processes and/or functions associated with the system 100, such as pulse waveform generation and/or cardiac pacing synchronization. For example, the memory 126 may be configured to store pulse waveform and/or heart pacing data for pulse waveform generation and/or cardiac pacing, respectively.

In some embodiments, the ablation device 110 can be configured to receive and/or deliver the pulse waveforms described in more detail below. For example, the ablation device 110 may be introduced into an endocardial space of a chamber of the heart (e.g., the left atrium) and placed to position one or more electrodes 112 at one or more pulmonary vein ostia, and then deliver the pulse waveforms to ablate tissue. The ablation device 110 may include one or more electrodes 112, which may, in some embodiments, contain at least one set of independently addressable electrodes. Each electrode may include an insulated electrical lead configured to sustain a voltage potential of at least about 700 V without dielectric breakdown of its corresponding insulation. In some embodiments, the insulation on each of the electrical leads may sustain an electrical potential difference of between about 200 V to about 4,000 V across its thickness without dielectric breakdown. For example, the electrodes 112 may be grouped into one or more paired subsets or anode-cathode subsets (e.g., subsets with electrodes configured to have opposite polarities) such as, for example, a subset including one anode and one cathode, a subset including two anodes and two cathodes, a subset including two anodes and one cathode, a subset including one anode and two cathodes, a subset including three anodes and one cathode, a subset including three anodes and two cathodes, and/or the like.

In some embodiments, the ablation device 110 includes a catheter defining a longitudinal axis. The catheter can include a catheter distal end, a distal portion disposed distally of the catheter distal end, and at least one spline. The spline can include a spline proximal end and a spline distal end, wherein the spline proximal end is coupled to the catheter distal end, and the spline distal end is coupled to the distal portion. Further, the spline can include a first electrode positioned over a portion of a surface of a spline, the first electrode comprising a surface having a proximal boundary and a distal boundary. The proximal boundary and the distal boundary can include closed curves, with the distal boundary located closer to the spline distal end and the proximal boundary located closer to the spline proximal end. Further, the spline can include a second electrode located closer to the spline proximal end than the first electrode.

In some embodiments, the electrodes 112 may include one or more contoured electrodes 114. Contoured electrodes 114 contain one or more contoured edges. Contoured edges can include electrode edges that contain at least one peak or at least one valley, as further described below.

The pacing device 130 may be suitably coupled to the patient (not shown) and configured to receive a heart pacing signal generated by the cardiac stimulator 128 of the apparatus 120 for cardiac stimulation. An indication of the pacing signal may be transmitted by the cardiac stimulator 128 to the signal generator 122. Based on the pacing signal, an ablation voltage pulse waveform may be selected, computed, and/or otherwise identified by the processor 124 and generated by the signal generator 122. In some embodiments, the signal generator 122 is configured to generate the pulse waveform in synchronization with the indication of the pacing signal (e.g., within a common refractory window). For example, in some embodiments, the common refractory window may start substantially immediately following a ventricular pacing signal (or after a very small delay) and last for a duration of approximately 250 milliseconds or less thereafter. In such embodiments, an entire pulse waveform may be delivered within this duration. In alternate embodiments, the ablation pulse waveform can be delivered without a pacing signal, i.e., asynchronously delivered, and therefore a pacing device may not be not needed.

The processor 124 may be any suitable processing device configured to run and/or execute a set of instructions or code. The processor may be, for example, a general-purpose processor, a Field Programmable Gate Array (FPGA), an Application Specific Integrated Circuit (ASIC), a Digital Signal Processor (DSP), and/or the like. The processor may be configured to run and/or execute application processes and/or other modules, processes and/or functions associated with the system and/or a network associated therewith (not shown). The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and/or the like.

The memory 126 may include a database (not shown) and may be, for example, a random access memory (RAM), a memory buffer, a hard drive, an erasable programmable read-only memory (EPROM), an electrically erasable read-only memory (EEPROM), a read-only memory (ROM), Flash memory, etc. The memory 126 may store instructions to cause the processor 124 to execute modules, processes and/or functions associated with the system 100, such as pulse waveform generation and/or cardiac pacing.

The system 100 may be in communication with other devices (not shown) via, for example, one or more networks, each of which may be any type of network. A wireless network may refer to any type of digital network that is not connected by cables of any kind. However, a wireless network may connect to a wireline network in order to interface with the Internet, other carrier voice and data networks, business networks, and personal networks. A wireline network is typically carried over copper twisted pair, coaxial cable or fiber optic cables. There are many different types of wireline networks including, wide area networks (WAN), metropolitan area networks (MAN), local area networks (LAN), campus area networks (CAN), global area networks (GAN), like the Internet, and virtual private networks (VPN). Hereinafter, network refers to any combination of combined wireless, wireline, public and private data networks that are typically interconnected through the Internet, to provide a unified networking and information access solution.

Figure 3:
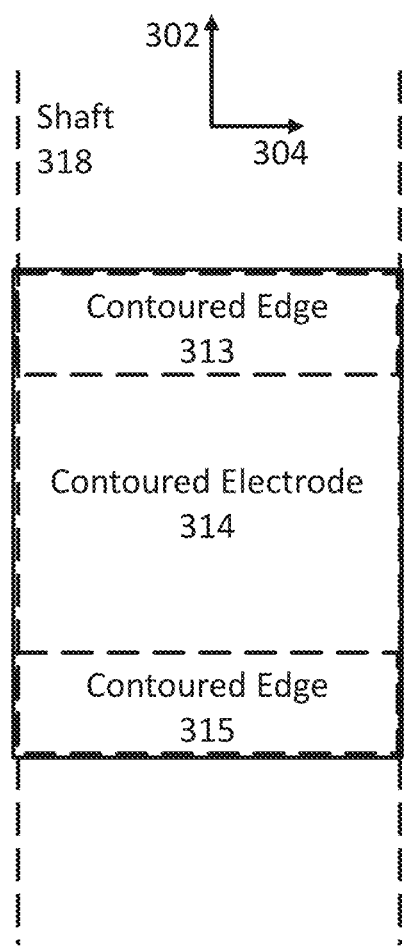
FIG. 3 is a schematic illustration of a contoured electrode, according to embodiments.

FIG. 3 is a schematic illustration of a contoured electrode 314 with contoured edges 313 and 315 disposed on a shaft or spline 318, according to various embodiments. The shaft or spline 318 may belong to an ablation device such as, for example, the ablation device 110, as described above. The ablation device can include one or more splines or shafts 318 with electrodes (including contoured electrode 314) disposed at discrete locations along a length of the splines or shafts. In some cases, the shaft 318 can include a cross-section that is substantially constant. For example, the shaft 318 can have a cross-section that is substantially circular, elliptical, etc. Alternatively, the shaft 318 can includes sections that have differing cross-sections.

Each contoured electrode 314 can have first and second edges, with at least one contoured edge 313, 315. For example, a contoured electrode 314 can have a single contoured edge 313. Alternatively, a contoured electrode 314 can have two contoured edges 313, 315. Contoured edges 313, 315 can be edges that include at least one peak and at least one valley when viewed along a width of the shaft 318. For example, shaft 314 can have a longitudinal axis 302 and a lateral axis 304 (i.e., an axis extending along a width of the shaft 314). A straight or non-contoured edge can be an edge that extends parallel to the axis 304, while a contoured edge (e.g., edge 313 or 315) can be an edge that has at least one portion that is angled (or has a unit tangent that is angled) relative to axis 304. In some embodiments, a contoured edge can have a periodic curve, with multiple peaks and valleys, while in other embodiments, a contoured edge can have a single peak and a single valley.

Figure 4:
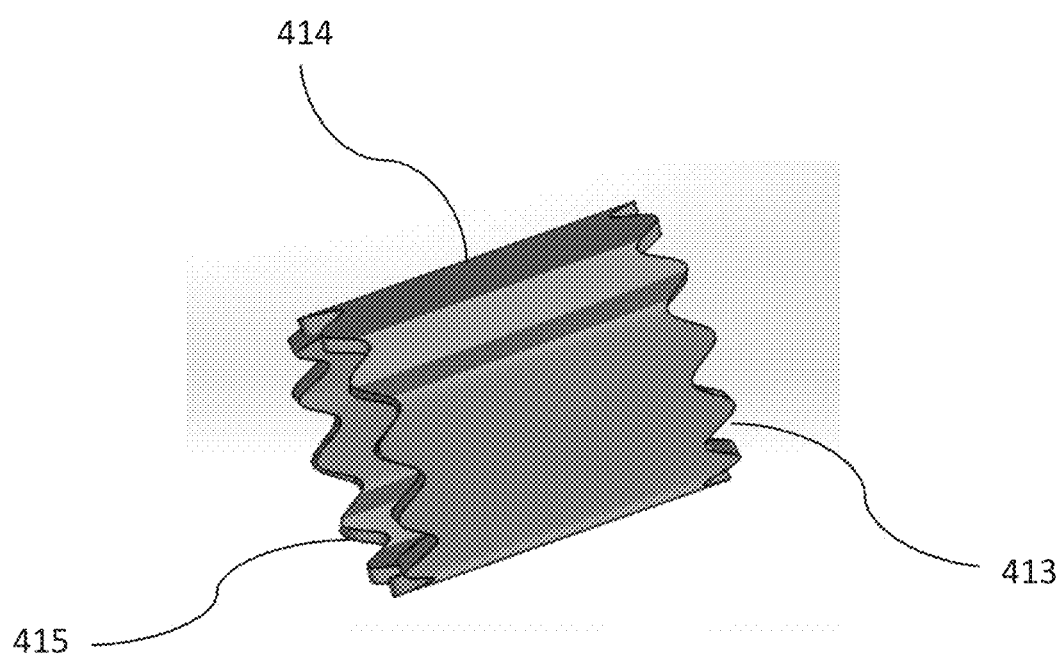
FIG. 4 is a perspective view of a contoured electrode, according to embodiments.

FIG. 4 is a perspective view of an electrode 414 comprising a first edge 413 and a second edge 415, according to embodiments. The electrode 414 can be an example of a contoured electrode 114, 314, as described above with respect to FIGS. 1 and 3, respectively. For example, the electrode 414 can be disposed on a spline or shaft (e.g., shaft 318) of an ablation device (e.g., ablation device 110). The first edge 413 may be opposite the second edge 415. For example, the first edge 413 may be a proximal edge while the second edge 415 may be a distal edge, or vice-versa. The electrode 414 may be, for example, generally cylindrical or annular (e.g., ring-like) in shape. In some embodiments, the electrode 414 may include a circular, ellipsoidal, flattened ellipse, or oval cross-section.

In some embodiments, the edges 413, 415 may include a non-linear shape. For example, the edges 413, 415 may include a generally wave-like pattern. As shown in FIG. 4, the edges 413, 415 may be contoured edges that are shaped (e.g., contoured) in a wave shape having peaks and valleys. In some embodiments, an edge 413, 415 may include one or more patterns. In some embodiments, an edge pattern may be one or more of sinusoidal or curvilinear. In some variations, an edge pattern may be periodic. In some embodiments, the edges 413, 415 may be rounded (e.g., smooth) or may include corners.

In some embodiments, the edges 413, 415 may be symmetric or not symmetric relative to itself or the other edge. In some embodiments, the edges may be identical or different relative to the other edge. In some embodiments, the edges may extend along a circumference of the electrode. In some embodiments, the contour may extend along a portion of the circumference of the electrode.

Figure 5A:
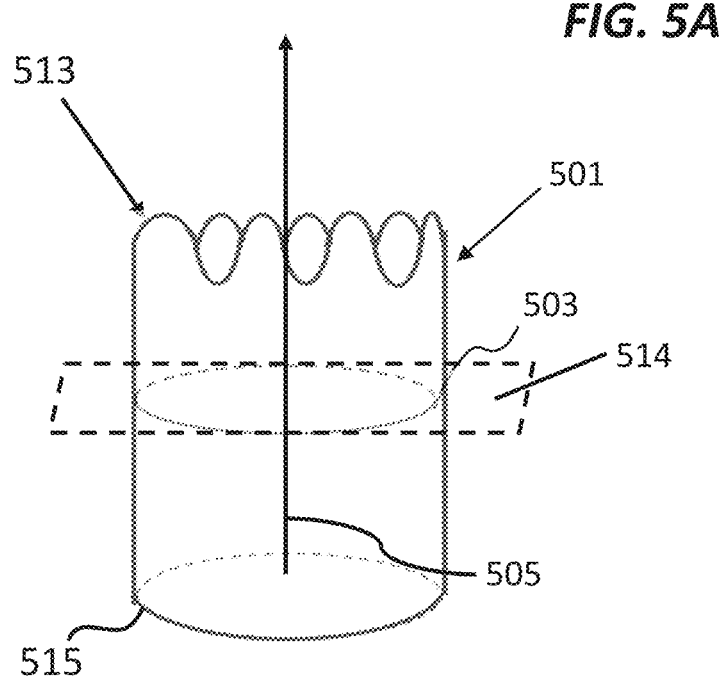
FIG. 5A is a side view of a contoured electrode, according to embodiments.

FIG. 5A shows an example of an electrode 501, according to embodiments. The electrode 601 can be an example of a contoured electrode 114, 314, as described above with respect to FIGS. 1 and 3, respectively. For example, the electrode 501 can be disposed on a spline or shaft (e.g., shaft 318) of an ablation device (e.g., ablation device 110). Electrode 501 may include a first edge 513 and a second edge 515. The first edge 513 may be a proximal edge while the second edge 515 may be a distal edge, or vice-versa. In an example embodiment, a cross-section 503 may be a constant shape (constant cross-section along the longitudinal axis). Distal edge 513 may be contoured (e.g., wavy) while proximal edge 515 may not be contoured (herein, such edge is referred to as a non-contoured edge, a straight edge, a flat edge, or an in-plane edge). Non-contoured edge 515 may lie in a single plane that is perpendicular to a longitudinal axis 505 of the electrode 501.

Figure 5B:
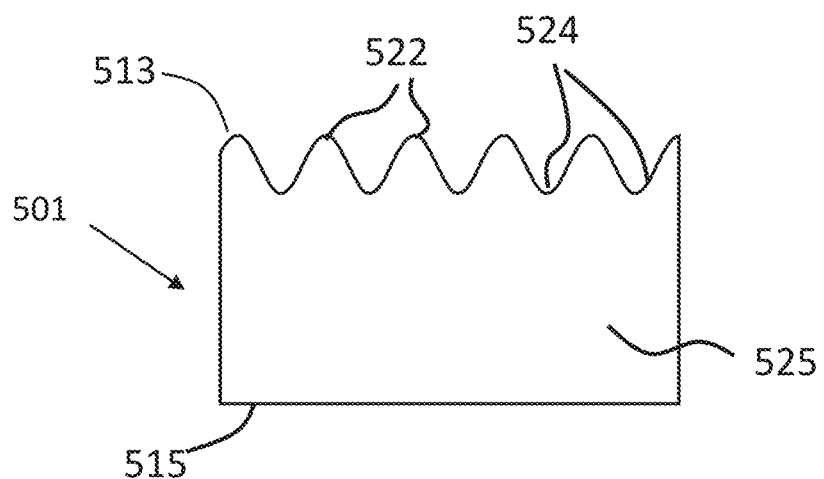
FIG. 5B is a side view of an unrolled contoured electrode, according to embodiments.
Figure 6:
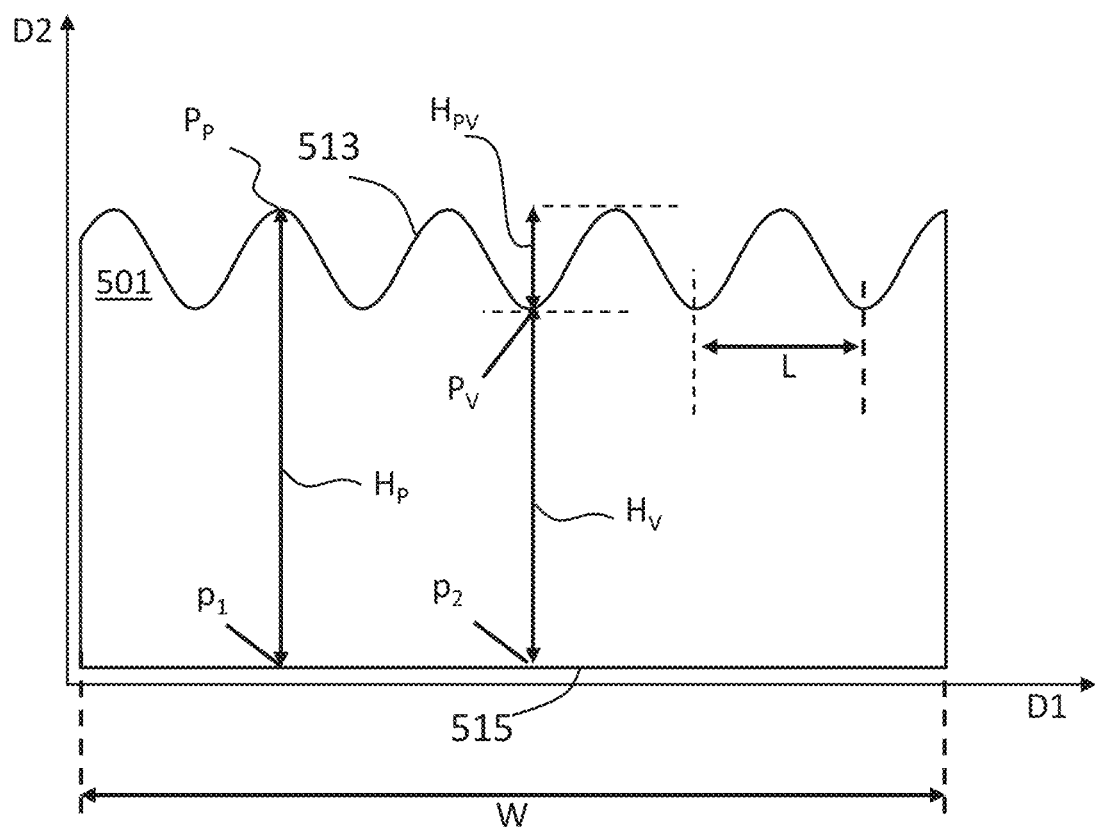
FIG. 6 is a side view of an unrolled contoured electrode, according to embodiments.

FIGS. 5B and 6 show views of the electrode 501 cut in a direction parallel to axis 505 and unrolled (e.g. flattened). In this rendering, a proximal edge 515 is a straight line, and distal edge 513 includes a set of peaks 522 and valleys 524. A surface of electrode 501 is represented by region 525. In various embodiments, region 525 may be made from any suitable electrically conductive material (e.g., a metal) that is biocompatible. As shown in FIG. 5A, a selected transverse plane 514 intersects electrode 501 and is perpendicular to electrode or spline axis 505. The cross-section 503 lies within transverse plane 514. In some embodiments, the electrode 501 may include a circular, ellipsoidal, flattened ellipse, or oval cross-section 503.

In various embodiments, peaks 522 can be convex portions, and the valleys 524 can be concave portions. For example, one or more convex portions (e.g., peak portions 522) of distal edge 513 may be configured to bulge outward such that points on a line connecting any two points on that convex portion lie inside the area bounded by the borders of the electrode 501. Similarly, one or more concave portions (e.g., valleys 524) may be configured such that points on a line connecting any two points on that concave portion lie outside the area bounded by the borders of the electrode 501. The convex and concave portions may each include one or more generally curvilinear sections.

As depicted in FIG. 6, electrode 501 may have an associated circumferential direction D1 and an associated longitudinal direction D2. In an example embodiment, a distance $H_P$ from a peak point $P_P$ of edge 513 and an associated closest point $p_1$ of edge 515 is larger than a distance $H_V$ from a valley point $P_V$ of edge 513 and an associated closest point $p_2$ of edge 515. In an example embodiment, $H_P$ may be a largest distance between closest points of edges 513 and 515 and $H_V$ may be the smallest distance between closest points of edges 513 and 515. As shown in FIG. 6, $H_P$ corresponds to a distance between a peak of edge 513 and an associated closest point of edge 515, while $H_V$ corresponds to a distance between a valley of edge 513 and an associated closest point of edge 515.

Contoured edge 513 can have a wave shape characterized by a wavelength and a peak height or wave depth. As shown in FIG. 6, difference between $H_P$ and $H_V$ corresponds to a depth of a wave and is given by $H_P - H_V = H_{PV}$. Additionally, the contoured edge 513 may be characterized by a predetermined wavelength L. In some embodiments, a ratio of $H_{PV}$ (i.e., the wave depth) to $H_P$ (i.e., a maximum electrode length along its longitudinal axis) may be between about 0.05 and about 0.75, including all values and sub-ranges in-between.

In various embodiments, a number of peaks for contoured edge 513 may depend on (1) a width W of edge 513, which can correspond to a circumference of a spline or shaft of an ablation device, and (2) the wavelength L. For example, a number of peaks $N_P$ is given by $N_P \sim W/L$. In embodiments described herein, edge 513 may have about one, about two, about three, about four, about five, about six, about seven, about eight, about nine, about ten, or more peaks with an associated number of valleys.

Figure 7A:
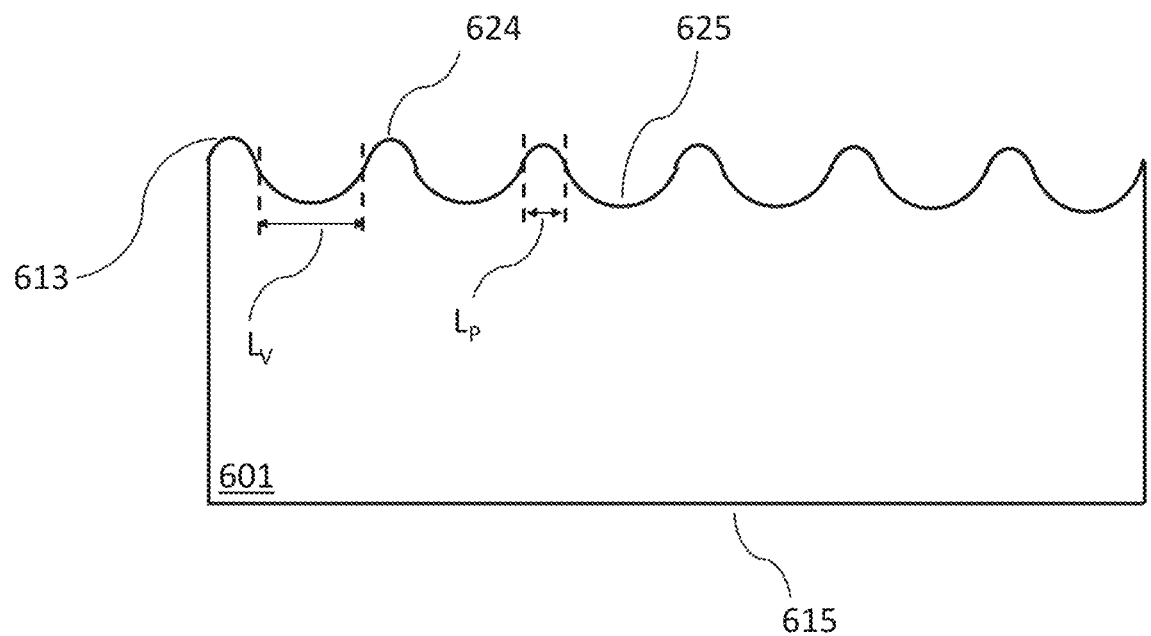
FIGS. 7A and 7B are side views of unrolled contoured electrodes, according to embodiments.
Figure 7B:
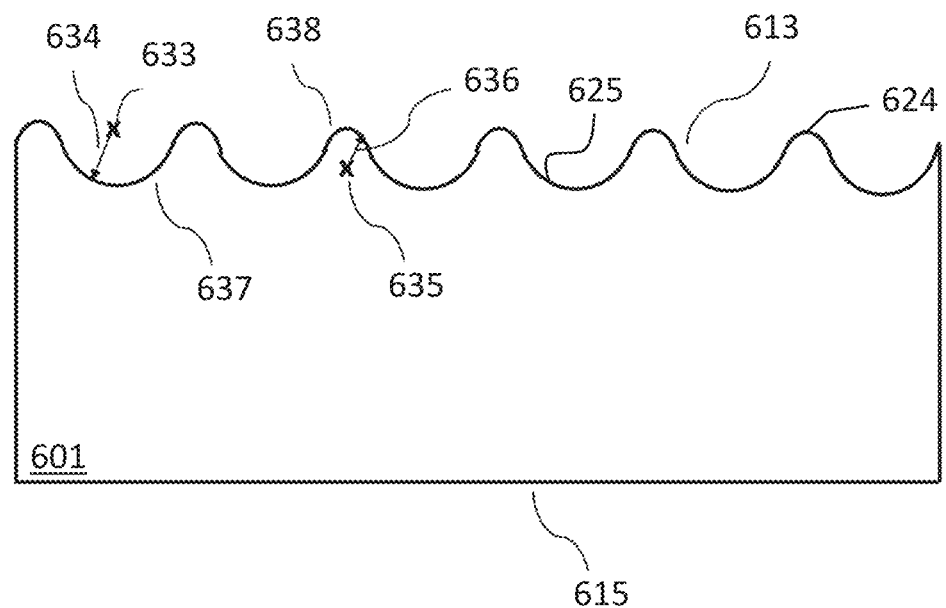

FIGS. 7A and 7B show unrolled (e.g., opened out) views of electrode 601 (e.g., ring electrode) including a first edge 613 and a second edge 615, according to embodiments. The electrode 601 can be an example of a contoured electrode 114, 314, as described above with respect to FIGS. 1 and 3, respectively. For example, the electrode 601 can be disposed on a spline or shaft (e.g., shaft 318) of an ablation device (e.g., ablation device 110). The first edge 613 may be a proximal edge while the second edge 615 may be a distal edge, or vice-versa. The first edge 613 can be a contoured edge and have a wave shape, while the second edge 615 can be a non-contoured edge and be straight in this unrolled rendering. The first edge 613 may include a set of peaks 624 (e.g., convex peaks) and valleys 625 (e.g., concave valleys). In some embodiments, each valley 625 may have the same first length $L_V$ and each peak 624 may have the same second length $L_P$. In some embodiments, the first length $L_V$ may be different from the second length $L_P$. As shown in FIG. 7A, the first and second lengths are measured in a circumferential direction, as described above with reference to FIG. 6.

Alternatively, in some embodiments, first length $L_V$ may be the same as (or smaller than) second length $L_P$. When $L_V = L_P$, such embodiment is referred to as a symmetric embodiment. Alternatively, in some embodiments, one or more peaks 624 may have unequal lengths and/or one or more valleys 625 may have unequal lengths, e.g., the valley lengths and peak lengths can generally be different. In such embodiments, the wave can be referred to as an asymmetric wave. In some embodiments, the electrode 601 can have a single peak 624 and a single valley 625, while in alternative embodiments, the electrode 601 can have multiple peaks 624 and/or multiple valleys 625.

In some embodiments, a longest dimension of a transverse cross section of the electrode 601 (e.g., a diameter of the electrode 601) may be between about 0.5 mm and about 6 mm, including all values and sub-ranges in-between. In some embodiments, an electrode length may be between about 0.5 mm and 9 mm, including all values and sub-ranges in-between. In some embodiments, a length of a peak of the first edge 613 may be between about 20 μm and about 20,000 μm, including all values and sub-ranges in-between. In some embodiments, a length of a valley of the first edge 613 may be between about 20 μm and 20,000 μm, including all values and sub-ranges in-between.

Valleys 625 and peaks 624 may be characterized by an associated curvature. In an example embodiment, a valley may have a first center of curvature 633, as shown in FIG. 7B. The first center of curvature 633 may lie outside the area bounded by the borders of the electrode 601 and may include an associated first radius of curvature 634, as shown in FIG. 7B. A second center of curvature 635 can correspond to a peak 625. Second center of curvature 635 may lie inside the area bounded by the borders of the electrode 601 and may include an associated second radius of curvature 636, as shown in FIG. 7B.

In some embodiments, the smallest radius of curvature 634 of a concave portion 637 of a valley 625 may be at least about 10 μm. In some embodiments, the smallest radius of curvature 636 of a convex portion 638 of a peak 624 can be at least about 10 μm. In some embodiments, the largest radius of curvature 634 of one or more concave portions 637 may be less than about 50,000 μm. In some embodiments, the largest radius of curvature 636 of one or more convex portions 638 may be less than about 500 μm. In some embodiments, one or more of the convex portions 638 and concave portion 637 of the edge 613 of the electrode 601 may include or be shaped as a circular arc. In some embodiments, a ratio of the radius of curvature of at least one concave arc to that of at least one convex arc may be greater than about 10.

Figure 8:
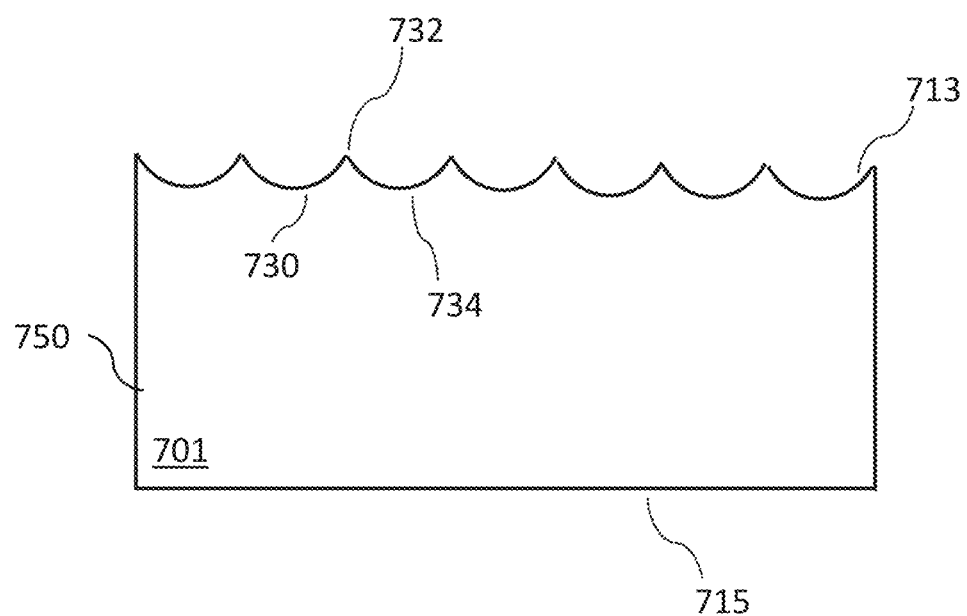
FIG. 8 is a side view of an unrolled contoured electrode, according to embodiments.

In some embodiments, a point of tangent discontinuity may be included as a peak or a valley of a contoured edge of an electrode. FIG. 8 is a side view in an unrolled rendering of an electrode 701 (e.g., cylindrical ring electrode) including first edge 713 and second edge 715, according to embodiments. The electrode 701 can be an example of a contoured electrode 114, 314, as described above with respect to FIGS. 1 and 3, respectively. For example, the electrode 701 can be disposed on a spline or shaft (e.g., shaft 318) of an ablation device (e.g., ablation device 110). The first edge 713 may be opposite the second edge 715. For example, the first edge 713 may be a proximal edge while the second edge 715 may be a distal edge, or vice-versa. The first edge 713 may include a set of concave portions, such as portions 730, 734. In some embodiments, the first edge 713 may have one or more tangent discontinuities between adjacent concave portions 730 and 734, which may be peaks 732 of electrode 701. That is, peaks 732 can be tangent discontinuity points.

FIGS. 9A-9E show example electrodes 801-805 with contoured first edges 811A-811E and contoured second edges 812A-812E, according to various embodiments. As shown, contoured edges 811A-811E, 812A-812E can be symmetrical and/or different in wavelength and/or wave depth. The electrodes 801-805 are shown unrolled (e.g., opened out) in FIGS. 9A-9E. The electrodes 801-805 can be examples of a contoured electrode 114, 314, as described above with respect to FIGS. 1 and 3, respectively. For example, the electrodes 801-805 can be disposed on a spline or shaft (e.g., shaft 318) of an ablation device (e.g., ablation device 110).

Figure 9A:
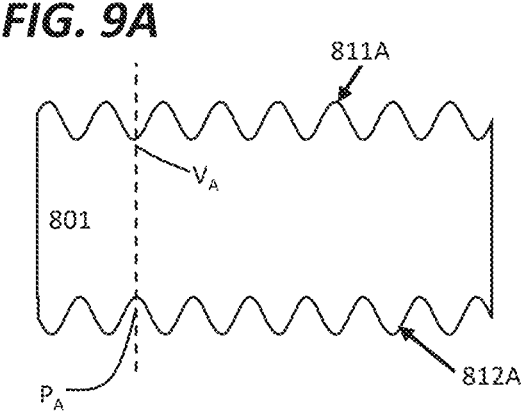
FIGS. 9A-9E are views of unrolled electrodes with two contoured edges, according to embodiments.
Figure 9B:
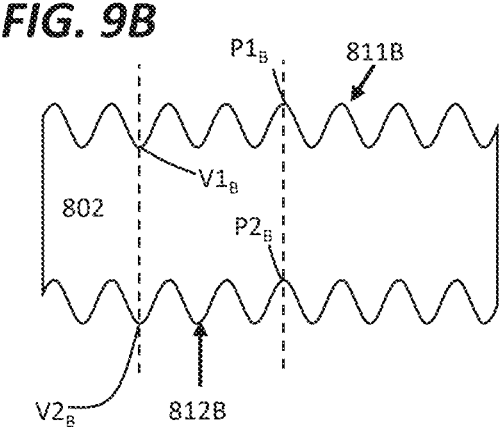
Figure 9C:
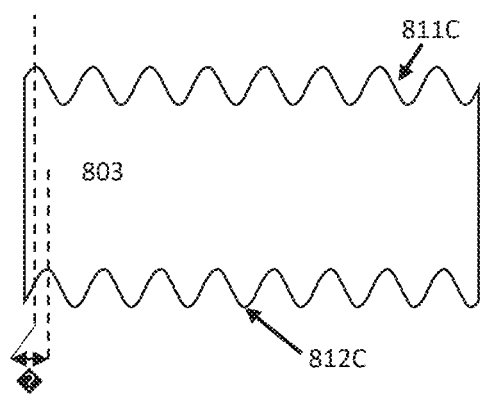
Figure 9D:
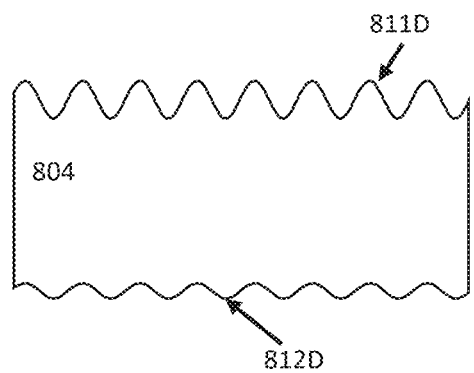
Figure 9E:
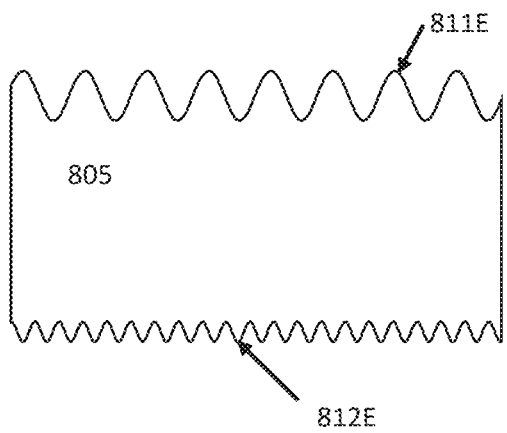

In an example embodiment shown in FIG. 9A, the edges 811A, 811B of electrode 801 can be symmetric with respect to one another in reflection, e.g., edge 812A can have reflectional symmetry with respect to edge 811A such that a peak of edge 812A lines up with a valley of edge 811A. In particular, a peak PA lines up with a valley $V_A$, as shown in FIG. 9A. Alternatively, in an example embodiment shown in FIG. 9B, edges 811B, 812B of electrode 802 can be symmetric with respect to one another in translation, e.g., edge 812B can have translational symmetry to edge 811B such that a valley $V1_B$ lines up with a valley $V2_B$, and a peak $P1B$ lines up with a peak $P2_B$. Alternatively, FIG. 9C shows electrode 803 with contoured edges 811C and 812C forming a phase shifted pattern characterized by edge 812C having the same peaks and valleys as edge 811C, but phase shifted by a predetermined value of @. Alternatively, FIG. 9D shows electrode 804 for which contoured edges 811D and 812D differ in amplitude. For example, edge 812D can have a smaller amplitude of peaks or wave depth relative to edge 811D. Alternatively, FIG. 9E shows an embodiment of electrode 805 with contoured edges 811E and 812E that have different wavelengths and wave depths. For example, edge 812E may have a smaller wavelength and therefore a larger number of peaks and valleys than edge 811E.

While FIGS. 9A and 9E depict different variations of electrodes having two contoured edges, it can be appreciated that any edge configurations may be combined in any suitable way. For instance, an amplitude varying pattern (FIGS. 9D and 9E) may be combined with a phase shifted pattern (FIG. 9C).

Figure 10:
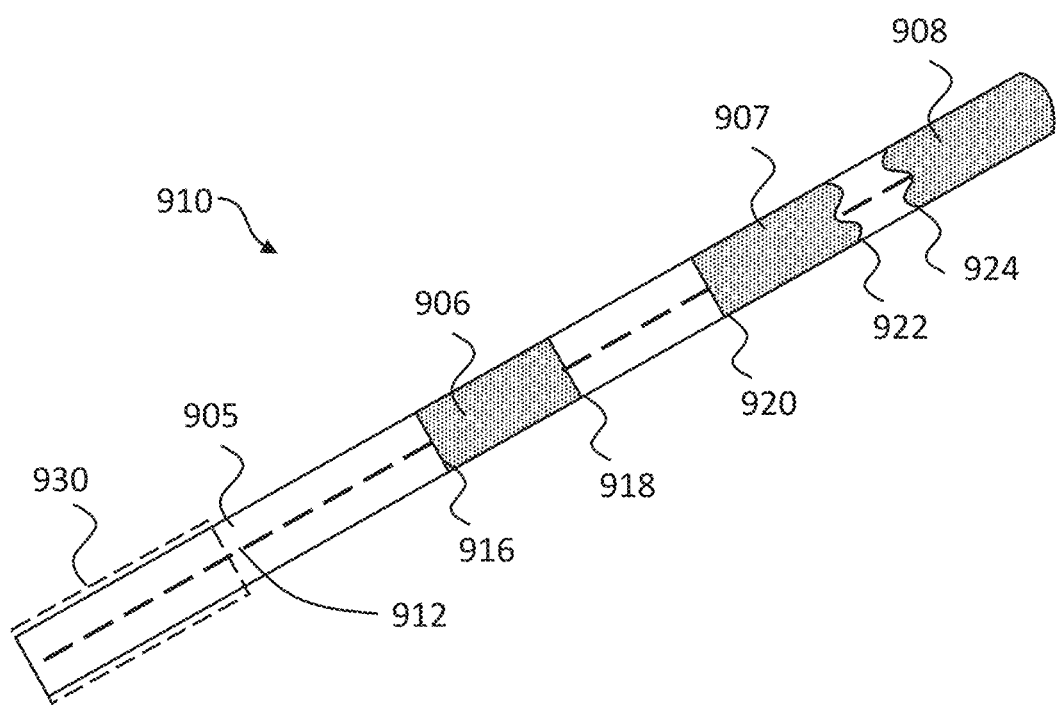
FIG. 10 schematically depicts a distal end of an ablation device having a linear shaft with contoured electrodes, according to embodiments.

FIG. 10 shows a distal end of an example ablation device 910, according to embodiments. Ablation device 910 can be structurally and/or functionally similar to other ablation devices described herein, including, for example, ablation device 110 described with reference to FIG. 1. Ablation device 910 can be an example of a linear ablation device. For example, ablation device 910 includes a shaft 905 and a plurality of electrodes 906, 907, and 908 disposed along shaft 905. In some embodiments, the plurality of electrodes 906, 907, and 908 may be configured to deliver ablation therapy, including high voltage electrical pulses for pulsed electric field ablation or irreversible electroporation. A sleeve or sheath 930 can optionally be disposed over a portion of the shaft 905. The sheath 930 and the shaft 905 can be configured to move relative to one another to expose a greater number or portion of electrodes disposed along the shaft 905. In such manner, the sleeve 930 can be used to reduce or increase a number of electrodes exposed outside of the sleeve 930 and are available for delivering ablation. Suitable examples of linear ablation devices are described in International Application Serial No. PCT/US2020/037948, filed on Jun. 16, 2020, and titled "SYSTEMS, DEVICES, AND METHODS FOR FOCAL ABLATION," the contents of which are hereby incorporated by reference in their entirety.

In some embodiments, ablation device 910 may be configured to be steered or deflected by a suitable deflection control mechanism, such as, or example, a pull wire 912. In some embodiments, one or more portions of the shaft 905 may be configured to be flexible and may be bendable via the deflection control mechanism 912. Additionally, or alternatively, one or more portions of the shaft 905 may be rigid, such as portions where electrodes 906, 907, and 908 are disposed.

In some embodiments, a distal end of ablation device 910 may include a distal tip electrode 908, e.g., implemented as a distal cap electrode. Electrodes 906 and 907 can be disposed proximal to distal tip electrode 908. In some embodiments, electrodes 907 and 908 may be generally cylindrical in shape (e.g., ring-shaped) with a proximal edge and a distal edge. For example, electrodes 906 and 907 may have respective edges 916, 918 and 920, 922. Distal tip electrode 908 may have a single edge 924. In some embodiments, one or more of edges 916, 918, 920, 922, 924 may be contoured edges. For example, as depicted in FIG. 10, distal edge 922 of electrode 907 and proximal edge 924 of distal tip electrode 908 may each have a contoured (e.g., wave, curvilinear) shape, as further described herein. In some embodiments, one or more peaks or valleys of contoured edges 922 and 924 may be aligned (e.g., in-line) along a longitudinal axis of ablation device 910. Additionally, or alternatively, one or more peaks or valleys of the contoured edges 922 and 924 may not be aligned with each other.

Figure 11:
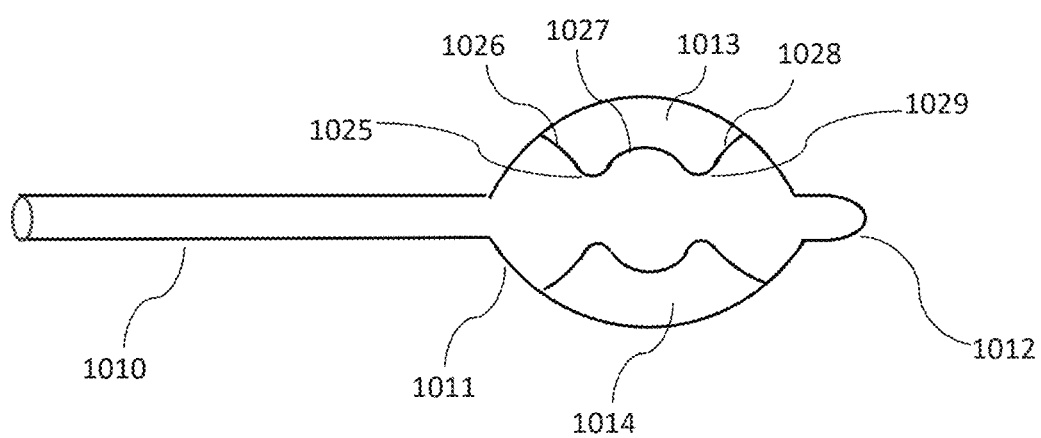
FIG. 11 schematically depicts a distal end of an ablation device having an expandable structure with contoured electrodes, according to embodiments.

FIG. 11 shows a distal end of an example ablation device 1000, according to embodiments. Ablation device 1000 can be structurally and/or functionally similar to other ablation devices described herein, including, for example, ablation device 110 described with reference to FIG. 1. Ablation device 1000 can be an example of a balloon ablation device or other ablation device with an expandable or inflatable structure. For example, ablation device 1000 can include a catheter shaft 1010 and an inflatable member 1011 (e.g., balloon) disposed at a distal portion of the ablation device 1000. Suitable examples of balloon ablation devices, such as for focal ablation, are described in International Application Serial No. PCT/US18/50660, filed on Sep. 12, 2018, titled "SYSTEMS, APPARATUSES, AND METHODS FOR VENTRICULAR FOCAL ABLATION," and published as International Application Publication No. WO 2019/055512, the contents of which are hereby incorporated by reference in their entirety.

In some embodiments, the ablation device 1000 may include a distal tip 1012. In some embodiments, the inflatable member 1011 may include one or more electrodes 1013 and 1014 disposed on a surface of the inflatable member 1011. For example, the inflatable member 1011 may be composed of a polymeric material, and the electrodes 1013 and 1014 may be composed of a metallic film deposited on the inflatable member 1011. As depicted in FIG. 11, the electrodes 1013 and 1014 may be contoured as described herein and may include one or more convex portions and concave portions along one or more edges. For example, electrode 1013 includes an edge having concave portions 1026, 1027, and 1028, and convex portions 1025 and 1029.

In some embodiments, the shaft 1010 may define a lumen configured for a guidewire (not shown) to be slidably disposed. For example, a guidewire may be configured for over-the-wire delivery of the ablation device 1000 to a predetermined location within the patient. While not depicted in FIG. 11, in some embodiments, catheter shaft 1010 may also include one or more contoured electrodes, with contours having any of the structures described herein.

In various embodiments, electrodes 1013 and 1014 are configured to be stretchable or expandable. Any suitable approaches may be used for forming stretchable electrodes (e.g., electrodes formed using a network of conductive overlapping filaments, such as metallic nanowires, embedded in (or disposed over) a stretchable and flexible substrate. In some cases, a stretchable electrode may be formed from a network of folded conductive elements which are configured to unfold to allow the stretchable electrode to stretch in one or more directions.

Figure 12:
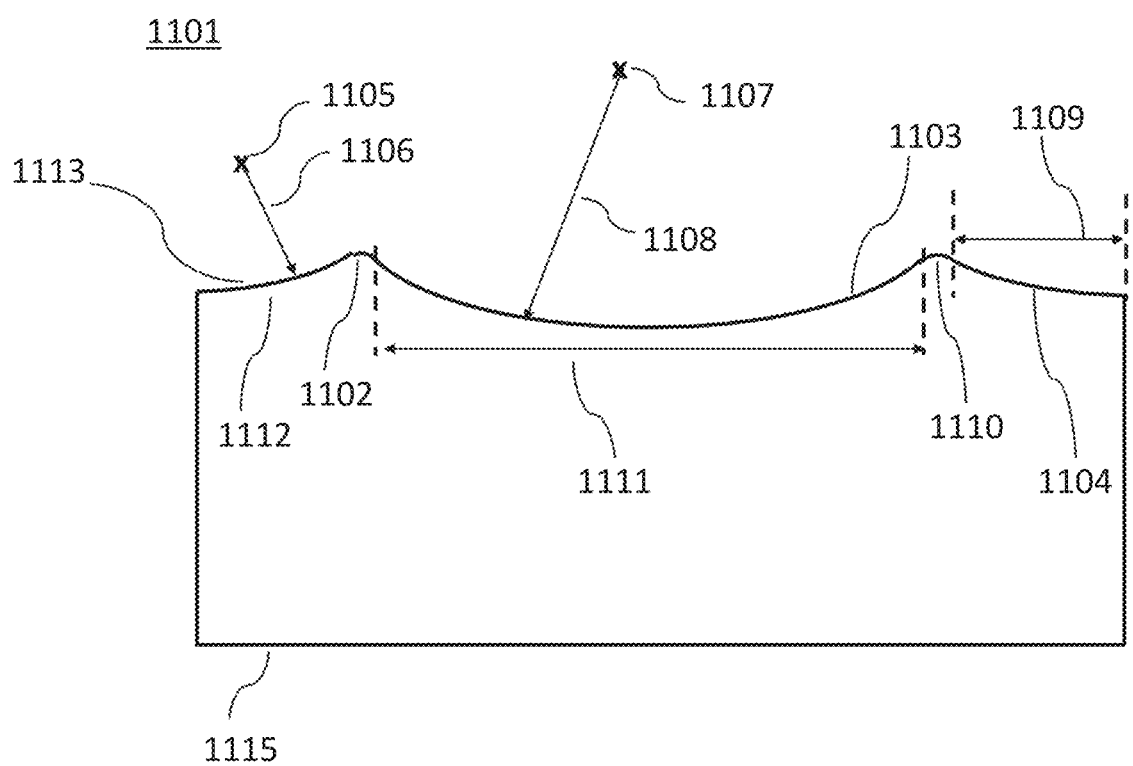
FIG. 12 is a side view of an unrolled contoured electrode of the ablation device depicted in FIG. 11, according to embodiments.

In some embodiments, an electrode, such as the electrodes 1013, 1014 depicted in FIG. 11, may include a plurality of concave portions and/or plurality of convex portions (e.g., a plurality of waves) having unequal lengths and/or radii of curvature. The electrode can be positioned on a balloon ablation catheter, as depicted with respect to FIG. 11, or the electrode can be positioned on a shaft or spline of a linear ablation catheter or basket ablation catheter. For example, FIG. 12 shows an example view of a ring electrode 1101 in an unrolled configuration with a contoured edge 1113 that includes a plurality of concave portions and/or plurality of convex portions (e.g., a plurality of waves) having unequal lengths and/or radii of curvature. The electrode 1101 can be an example of a contoured electrode 114, 314, as described above with respect to FIGS. 1 and 3, respectively. For example, the electrode 1101 can be disposed on a spline or shaft (e.g., shaft 318) of an ablation device (e.g., ablation device 110).

Electrode 1101 includes a first edge 1113 and a second edge 1115. For example, first edge 1113 may have a generally asymmetric and non-uniform wave shape, while second edge 1115 may be straight (i.e., non-contoured). The first edge 1113 may include a set of peaks 1102, 1110 and valleys 1103, 1104, 1112. Peaks 1102, 1110 may be convex portions, and valleys 1103, 1104, 1112 may be concave portions. First edge 1113 may include generally asymmetric waves.

In some embodiments, a first center of curvature 1105 corresponds to valley 1112. The first center of curvature 1105 may lie outside the area bounded by the borders of the electrode 1101 and may include an associated first radius of curvature 1106. A second center of curvature 1107 corresponds to valley 1103. The second center of curvature 1107 may lie outside the area bounded by the borders of the electrode 1101 and may include an associated second radius of curvature 1108. The first radius of curvature 1106 may be different from the second radius of curvature 1108. In some embodiments, valleys may have different lengths. For example, valley 1104 may have a first length 1109 and valley 1103 may have a second length 1111.

Figure 13:
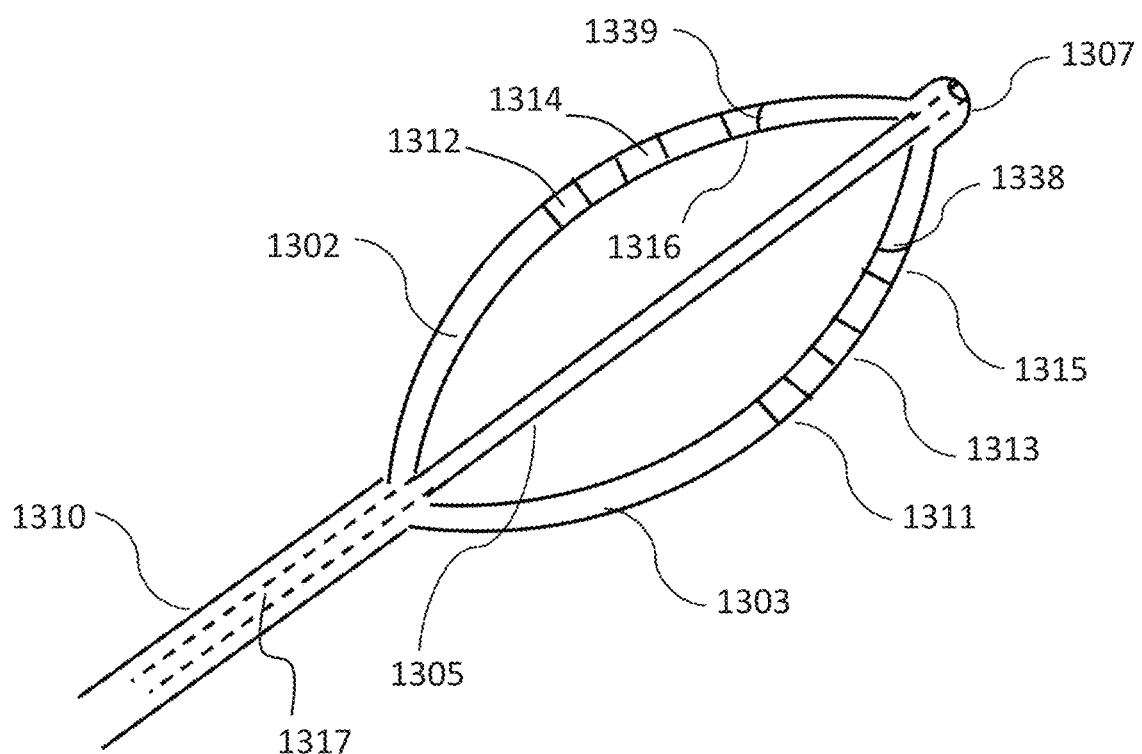
FIG. 13 schematically depicts a distal end of an ablation device having a basket shape and including contoured electrodes, according to embodiments.

FIG. 13 shows ablation device 1301, having electrodes 1311-1316, according to embodiments. Ablation device 1301 can be structurally and/or functionally similar to other ablation devices described herein, including, for example, ablation device 110 described with reference to FIG. 1. Ablation device 1301 can be an example of a basket ablation device or other type of expandable ablation device.

Ablation device 1301 includes a shaft 1310 at a proximal end of the device 1301, a guidewire lumen 1317, a distal tip 1307, and one or more splines 1302, 1303, as shown in FIG. 13. The guidewire lumen 1317 may be disposed within the shaft 1310 and configured to extend to the distal tip 1307. A guidewire (not shown) may be configured to be slideably disposed within the guidewire lumen 1317. For example, a guidewire may be configured for over-the-wire delivery of the ablation device 1301 to predetermined location within the patient.

In some embodiments, one or more of the splines 1302, 1303 may include one or more electrodes (e.g., ring electrodes) disposed along its length. For example, electrodes 1311, 1313, and 1315 can be disposed on spline 1303, and electrodes 1312, 1314, and 1316 can be disposed on spline 1302. Distal tip 1307 may include an atraumatic shape to reduce trauma to tissue. A proximal end of the set of splines 1302, 1303 (or of a single spline, if only one spline is used)

may be coupled to a distal end of the catheter shaft 1310, and a distal end of the set of splines 1302, 1303 (or of a single spline, if only one spline is used) may be coupled to the distal tip 1307 of device 1301.

Ablation device 1301 may be configured for delivering a pulse waveform to tissue via the electrodes 1311-1316 disposed on the splines 1302, 1303. In an example embodiment, any suitable number of splines may be used (e.g., there can be one, two, three, four, five, six, seven, eight, nine, ten, etc. splines). In example embodiments, ablation device 1301 includes 3-20 or more splines, including all values and sub-ranges in between. In some cases, ablation device 1301 may include more than 20 splines.

Splines 1302 and 1303 may include one or more jointly wired or independently addressable electrodes 1311-1316 formed on surfaces of splines 1302, 1303. Each electrode (e.g., electrodes 1311-1316) may include an insulated electrical lead configured to sustain a voltage potential of at least about 700 V without dielectric breakdown of its corresponding insulation. In some embodiments, the insulation on each of the electrical leads may sustain an electrical potential difference of between about 200 V and about 4,000 V across its thickness without dielectric breakdown. Each spline 1302, 1303 can include or contain the insulated electrical leads of those electrodes that are formed on a body of that spline 1302, 1303 (e.g., within a lumen of the spline). In cases where the electrodes on a single spline are wired together, a single insulated lead may carry strands connecting to different electrodes on the spline.

In some embodiments, distal electrodes 1315, 1316 (and/or any of the electrodes) may include distal edges 1338, 1339, respectively, having a contoured shape as described herein. In some embodiments, different splines can include electrodes having different contouring and/or distal and proximal electrodes on each spline can include electrodes having different contouring, according to embodiments described herein. The electrodes on each spline 1302, 1303 can be grouped in a distal electrode (i.e., electrodes 1315, 1316) and a set of proximal electrodes (i.e., electrodes 1311, 1312, 1313, 1314). In some embodiments, proximal electrodes 1311, 1312, 1313, 1314 can be substantially similar in size and shape. Proximal electrodes 1311 and 1313 (and similarly proximal electrodes 1312 and 1314) can be spaced from one another by a first distance, and a distal edge of proximal electrode 1313 and a proximal edge of distal electrode 1315 (and similarly a distal edge of proximal electrode 1314 and a proximal edge of distal electrode 1316) can be spaced from one another by a second distance. In some embodiments, the first and second distances can be different. For example, the second distance can be greater than the first distance. Alternatively, the first and second distances can be the same. While certain spacing and arrangements of electrodes are described herein, it can be appreciated that the size, shape, and spacing of the electrodes may differ without departing from the scope of the present disclosure.

In various embodiments, splines 1302 and 1303 may be flexible. In some embodiments, the ablation device 1301 may be configured to be deployed by pulling on the guidewire lumen 1317 by an actuation mechanism disposed at a handle (not shown) of the ablation device 1301. As the guidewire lumen 1317 is pulled in along the shaft 1310, the splines 1302, 1303 may be configured to bow outward in an expanded configuration (e.g., in a basket-like shape). In some embodiments, the ablation device 1301 may not have a guidewire lumen and may instead include a deflection mechanism (e.g., a pull wire) for steering the ablation device 1301 towards a predetermined anatomical target. In some cases, the splines 1302, 1303 can be configured to transform between a first configuration (e.g., undeployed configuration) where the splines 1302, 1303 are arranged substantially parallel to the longitudinal axis of the ablation device 1301 and a second configuration (e.g., expanded or deployed configuration) where the splines 130, 1303 bow radially outward from the longitudinal axis of the ablation device 1301 (or a longitudinal axis of the shaft 1310). In some embodiments, the splines 1302, 1303 in the second configuration can form a basket having an asymmetric shape along its length, so that one end (for example, the distal end) of the basket is more bulbous than the other end (for example, the proximal end) of the basket.

In some embodiments, when suitably deployed, the splines may be configured to form a nearly planar petal-like configuration (e.g., flower configuration) or to form a basket. For example, ablation devices disclosed herein may include structural and/or functional components similar to those described in U.S. Pat. No. 10,172,673, filed on Sep. 21, 2017, and titled "SYSTEMS DEVICES, AND METHODS FOR DELIVERY OF PULSED ELECTRIC FIELD ABLATIVE ENERGY TO ENDOCARDIAL TISSUE," and U.S. Pat. No. 10,660,702, filed on Apr. 3, 2020, and titled "SYSTEMS, DEVICES, AND METHODS FOR FOCAL ABLATION," the contents of each of which are hereby incorporated by reference in their entirety.

In one embodiment, proximal electrodes 1311, 1312, 1313, 1314 can be configured to have a first polarity while distal electrodes 1315, 1316 can be configured to have a second polarity opposite the first polarity. In such matter, subsets of proximal electrodes 1311, 1312, 1313, 1314 and distal electrodes 1315, 1316 can be configured to act as paired anode-cathode subsets. Alternatively, different combinations of electrodes can be selected to act as anode-cathode subsets. The paired anode-cathode subsets can be configured to deliver pulsed field ablation to tissue, as described with reference to FIG. 1 above.

Referring more specifically to the contouring of distal electrodes 1315, 1316, these distal electrodes can have contoured edges 1338, 1339, respectively, that are selected to reduce an electrical field intensity below a target value in the vicinity of the contoured edges 1338, 1339. Such reduction in the electrical field intensity may alleviate electrolysis and/or associated generation of bubbles within a medium in which the ablation device 1301 is placed (e.g., within a liquid medium such as blood).

Figure 14:
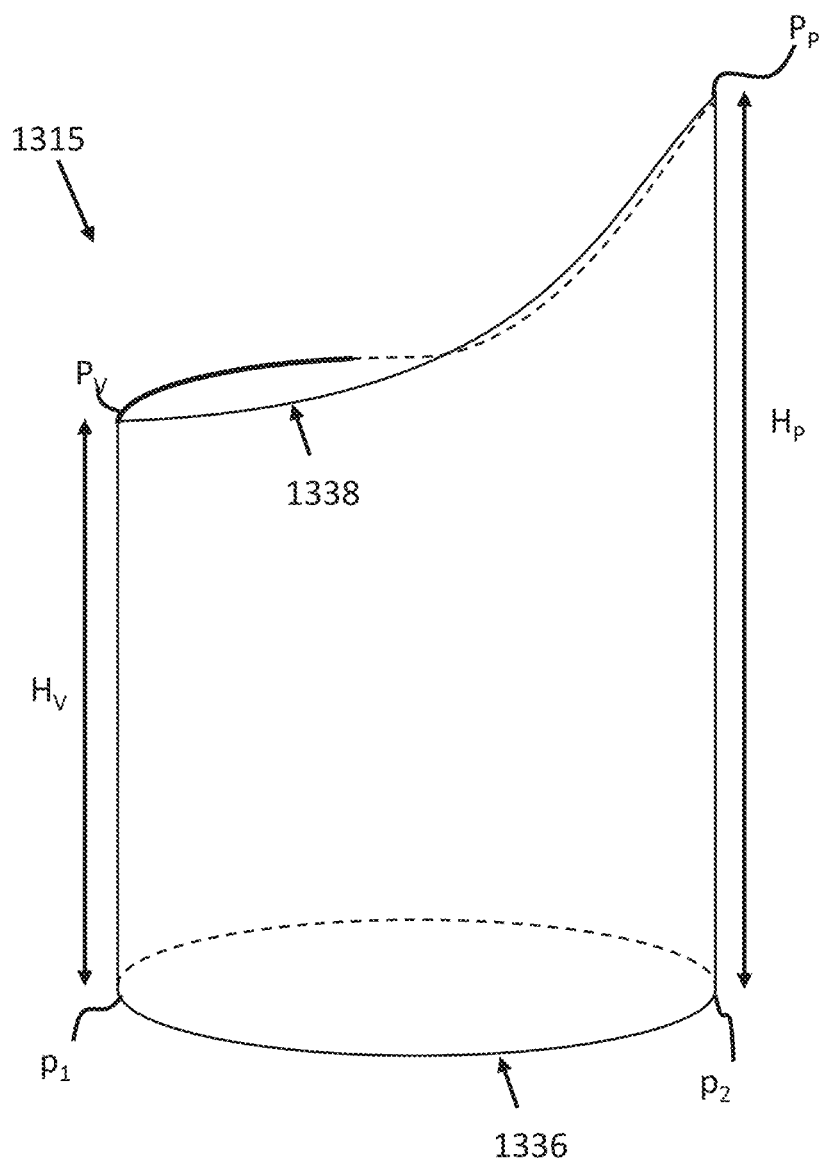
FIG. 14 schematically depicts a contoured electrode of the ablation device depicted in FIG. 13, according to embodiments.

FIG. 14 is an enlarged view of electrode 1315 of ablation device 1301. As shown, electrode 1315 includes a first edge 1338 and a second edge 1336. The first edge 1338 may be opposite the second edge 1336. For example, the first edge 1338 may be a distal edge while the second edge 1336 may be a proximal edge, or vice-versa. Electrode 1315 may be, for example, generally cylindrical (e.g., ring-like) in shape. In some embodiments, electrode 1315 may include a circular, ellipsoidal, flattened ellipse, or oval cross-section.

As described above, first edge 1338 can include a contoured pattern. For instance, edge 1338 may have at least one peak and at least one valley. For instance, a distance $H_P$ between a peak point $P_P$ located on edge 1338 and a closest point $p_2$ located on edge 1336 is larger than a corresponding distance $H_V$ between a valley point $P_V$ located on an edge 1338 and an associated closest point $p_1$ located on edge 1336. In an embodiment, points $P_P$ and $P_V$ can be connected by a smooth curve without any discontinuities, while in an alternative embodiment, points $P_P$ and $P_V$ can be connected with a curve including one or more discontinuities and/or one or both of points $P_P$ and $P_V$ can be a discontinuity point.

Edges 1336 and 1338, as shown in FIG. 14, are only illustrative and other contoured edges may be used. For example, edge 1336 may be similarly contoured as edge 1338. In some embodiments, contours of edges 1336 and 1338 may include multiple peaks and valleys. For example, a contour of edge 1338 may include a repeating pattern, such as, for example, a sinusoidal pattern. In some embodiments, the edges 1336 and 1338 may be symmetric or not symmetric relative to each other and/or different portions of edges 1336 and 1338 can be symmetric relative to other portions of edges 1336 and 1338.

For illustrating the localized effect of contoured electrodes on the electric field, FIGS. 15A and 15B depict two arrangements of electrodes (e.g., on neighboring splines). FIG. 15A is a schematic view of electrodes 1210A, 1210B disposed on respective parallel splines 1211A, 1211B (e.g., parallel splines 1211A and 1211B may be approximations of splines of an ablation device 110 in a basket configuration). Electrodes 1210A, 1210B may be ring electrodes. First electrode 1210A may be mounted on first spline 1211A while second electrode 1210B may be mounted on second spline 1211B. In some embodiments, the splines 1211A and 1211B may be composed of a polymeric material. In demonstrating a computational model of an electric field produced by the electrodes, the electrodes may be surrounded by a blood pool and a voltage potential difference of about 1 kV may be applied across the electrodes 1210A, 1210B. In FIGS. 15A and 15B, diameters and lengths (along a longitudinal axes 1201A and 1201B) of electrodes 1210A, 1210B are respectively the same. As depicted, electrodes 1210A, 1210B do not include any contoured edges. In particular, electrode 1210A includes first and second edges 1213A, 1215A that are not contoured, and electrode 1210B includes first and second edges 1213B, 1215B that are not contoured.

FIG. 15B is a schematic view of electrodes 1220A, 1220B disposed on parallel splines 1221A, 1221B (e.g., parallel splines 1221A and 1221B may be approximations of splines of an ablation device 110 in a basket configuration). Electrode 1220A has an upper edge contour (first edge) 1223A, and electrode 1220B has an upper edge contour (first edge) 1223B. Each of the edges 1223A, 1223B can have a single valley and for exemplary purposes, a tangent discontinuity at a peak. In other embodiments, the edge contour can be continuous at the peak. Electrodes 1220A, 1220B also have lower edges 1225A, 1225B that are not contoured. In FIG. 15B, the diameters of the electrodes 1220A, 1220B and the length (along a longitudinal axis of each spline 1221A, 1221B) of the electrodes 1220A, 1220B are respectively the same for the two electrodes 1220A, 1220B. In demonstrating a computational model of an electric field produced by the electrodes, the electrodes 1220A, 1220B may be surrounded by a blood pool and a voltage potential difference of about 1 kV may be applied across the electrodes 1220A, 1220B.

Figure 16:
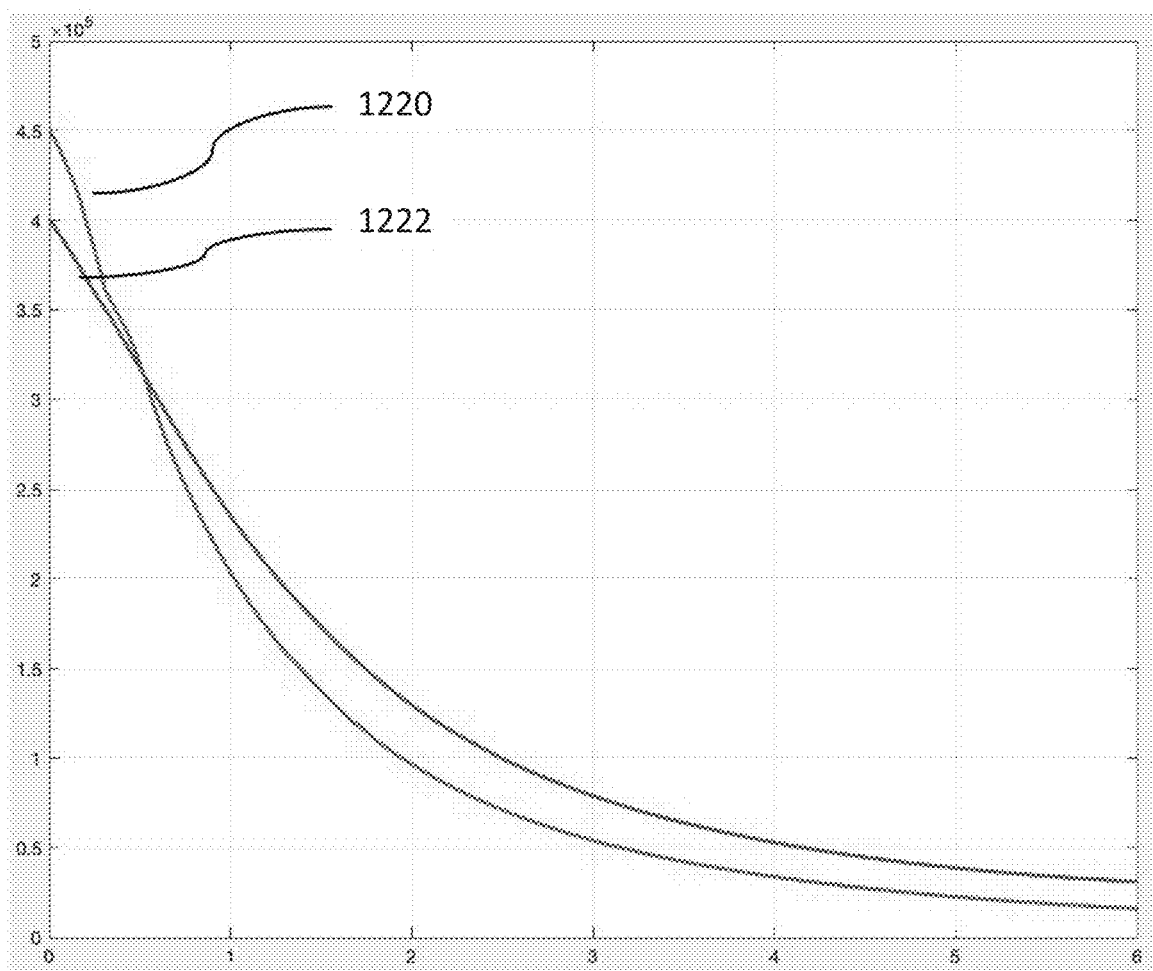
FIG. 16 is a graph of electrical field intensities along a side of the shafts as depicted in FIGS. 15A and 15B, according to embodiments.

FIG. 16 is a graph showing electric field intensity along lines 1201A, 1201B in FIGS. 15A and 15B. Line 1201A can be an imaginary line that runs parallel to a longitudinal axis of spline 1211A, and line 1201B can be an imaginary line that runs parallel to a longitudinal axis of spline 1221A. Lines 1201A, 1201B can be equal and about 600 μm in length. As noted above, to demonstrate the electric field produced by the electrodes, it can be assumed that electrodes 1210A, 1210B, 1220A, 1220B are positioned in a conductive medium (e.g., a blood pool) and that a voltage potential difference of about 1 kV is applied across electrodes 1210A, 1210B as a pair and electrodes 1220A, 1220B as a pair. FIG. 16 shows the difference in the electric field intensity along lines 1201A, 1201B as a result of the differing electrode geometries. In FIG. 16, the horizontal axis starts at the interface between the electrode and the material of the spline (e.g., electrode-polymer interface) and extends longitudinally parallel to the polymer surface of each spline.

As shown in FIG. 16, plot line 1220 represents the electric field intensity of electrodes 1210A and 1210B with non-contoured edges 1213A and 1213B, while plot line 1222 represents the electric field intensity of electrodes 1221A and 1221B with contoured edges 1223A and 1223B. As shown in FIG. 16, the contoured electrodes have a smaller electric field intensity than the non-contoured electrodes near the electrode-spline interface (e.g., electrode-polymer interface). Furthermore, the gradient or drop-off of the electric field intensity is less steep for the contoured electrodes than the non-contoured electrodes. This relationship generally applies for other contoured edge geometries as described herein relative to non-contoured electrode geometries. Accordingly, as depicted in FIG. 16, systems, devices, and methods described herein including electrodes with contoured edges can reduce the electric field intensity at the contoured edge of the electrodes and reduce the drop-off of the electric field intensity, both of which can improve the safe delivery of irreversible electroporation in medical applications (e.g., cardiac ablation procedures).

Figure 17A:
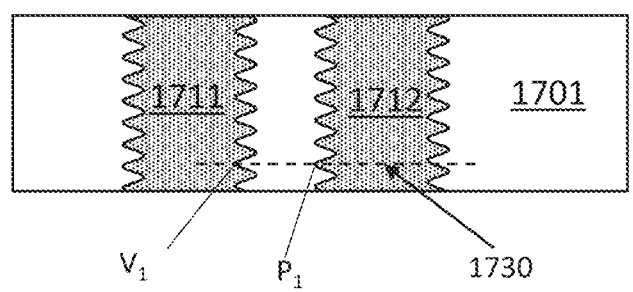
FIGS. 17A and 17B schematically depict splines or shafts of an ablation device having two adjacent electrodes with contoured edges, according to embodiments.
Figure 17B:
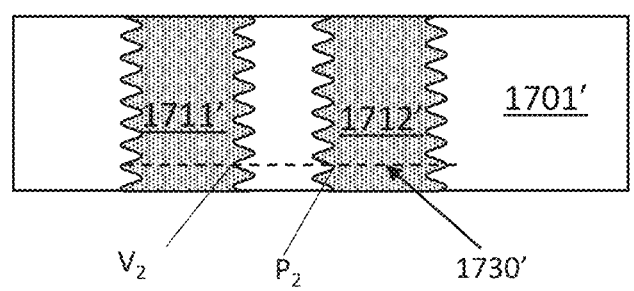

In some embodiments, multiple electrodes disposed on a shaft or spline can have electrodes each with contoured edges. FIGS. 17A and 17B show examples of ablation devices 1701 and 1701' with respective electrodes 1711, 1712, and 1711', 1712', according to embodiments. In use, electrodes 1711, 1712 can be energized as an electrode pair, and similarly electrodes 1711', 1712' can be energized as an electrode pair, for delivering pulsed field ablation. Electrodes 1711, 1712, 1711', and 1712' may include contoured edges. As depicted in FIG. 17A, electrodes 1711, 1712 can have contoured edges that are synchronized, i.e., a valley (e.g., a valley $V_1$) of electrode 1711 can be synchronized with a peak (e.g., a peak $P_1$) of electrode 1712 along direction 1730. In an alternative arrangement, electrodes 1711', 1712' can have contoured edges that are non-synchronized, i.e., a valley (e.g., a valley $V_2$) of electrode 1711' is synchronized with a peak (e.g., a peak $P_2$) of electrode 1712' along direction 1730', as shown in FIG. 17B.

Figure 18:
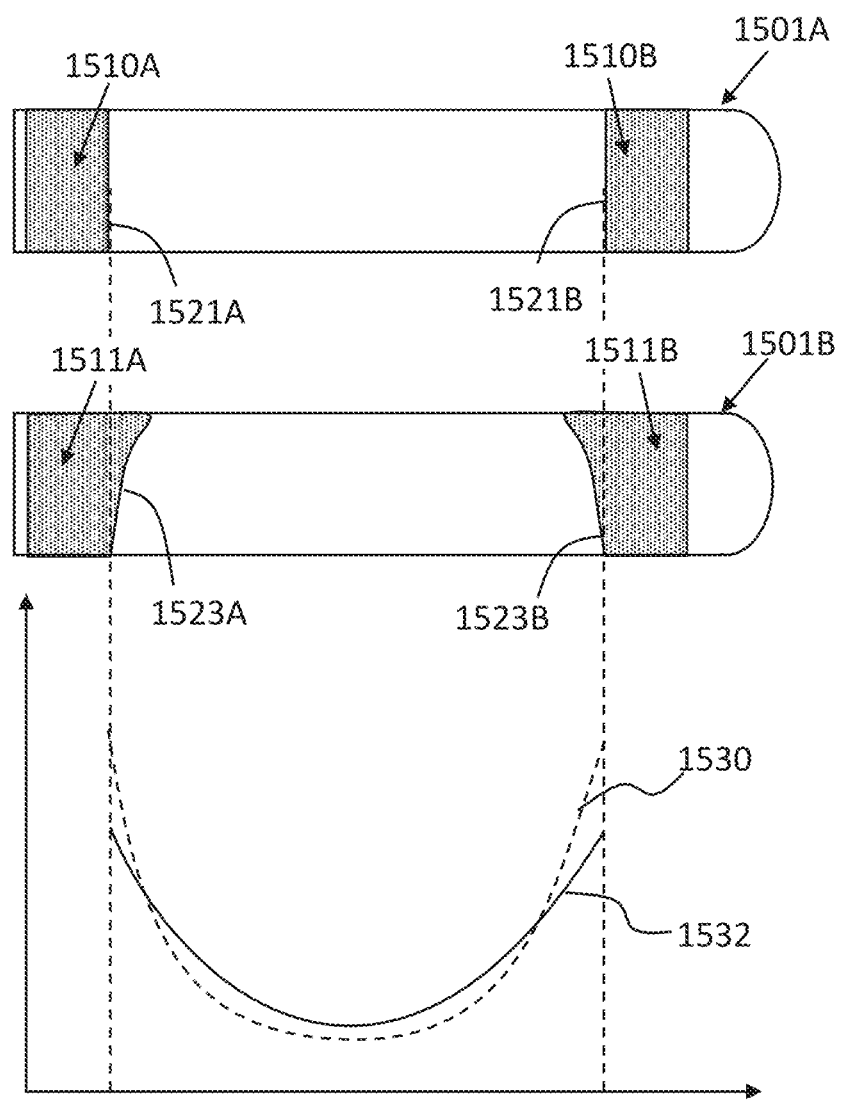
FIG. 18 schematically depicts shafts or splines or an ablation device having electrodes without and with contoured edges facing one another, and a graph of electric field intensities along a side of the shafts, according to embodiments.

FIG. 18 schematically depicts adjacent electrodes with and without contoured edges, and plots of their respective electric field intensity between the adjacent electrodes. In particular, two adjacent electrodes 1510A and 1510B with respective non-contoured edges 1521A and 1521B are disposed on a shaft or spline 1501A, and two adjacent electrodes 1511A and 1511B with respective contoured edges 1523A and 1523B are disposed on a shaft or spline 1501B. Plot lines 1530 and 1532 illustratively depict the difference in the electric field intensity along the longitudinal axis of the shafts 1501A, 1501B in the space between the adjacent electrodes 1510A, 1510B, 1511A, 1511B. As shown, the contoured electrodes 1511A, 1511B can have a smaller electric field intensity than the non-contoured electrodes 1510A, 1510B near the electrode-polymer interface. Furthermore, the gradient or drop-off of the electric field intensity is less steep for the contoured electrodes 1511A, 1511B than the non-contoured electrodes 1510A, 1510B.

Methods

Also, consistent with disclosed embodiments, a method for ablating tissue is also provided. In some embodiments, the method includes delivering an ablation device to a cardiac chamber of a heart of a patient, deploying the ablation device (e.g., positioning the device near a target site, deploying the device, etc.), and delivering a pulse waveform to the ablation device such that the ablation device generates a pulsed electric field for ablating tissue.

In various embodiments, system 100 may be used to ablate tissue using various methods described herein. In an example embodiment, the tissue ablation is performed in or near one or more heart chamber(s) using the systems and devices described herein. In an embodiment, the heart chamber(s) may be the left atrial chamber and include its associated pulmonary veins, while the devices and methods described herein can also be used in other cardiac chambers. Generally, one or more catheters may be advanced in a minimally invasive fashion through vasculature to a target location. For example, an ablation device may be advanced through vasculature over a guidewire and through a deflectable sheath. The sheath may be configured for deflection and aid in guiding a focal ablation catheter through vasculature and one or more predetermined targets (e.g., pulmonary vein ostia). A dilator may be advanced over a guidewire and configured for creating and dilating a transseptal opening during and/or prior to use. The methods described here include introducing and disposing an ablation device (e.g., ablation device) in contact with one or more pulmonary vein ostial or antral regions. Optionally, a pacing signal may be delivered to the heart using a cardiac stimulator (e.g., cardiac stimulator) and/or measure cardiac activity. Spatial characteristics (e.g., position, orientation, configuration) of the ablation device and tissue may be determined and used to generate an expected ablation zone and/or tissue map for display. A pulse waveform may be delivered by one or more electrodes of the ablation device to ablate tissue. The tissue map including ablated tissue and the expected ablation zone may be updated in real-time on the display as the device is navigated through tissue and additional pulse waveforms are delivered to the tissue.

In some embodiments, ablation energy may be delivered in synchrony with cardiac pacing. In some embodiments, the voltage pulse waveforms described herein may be applied during a refractory period of the cardiac cycle so as to avoid disruption of the sinus rhythm of the heart. Alternatively, the ablation energy can be delivered asynchronously.

Figure 2:
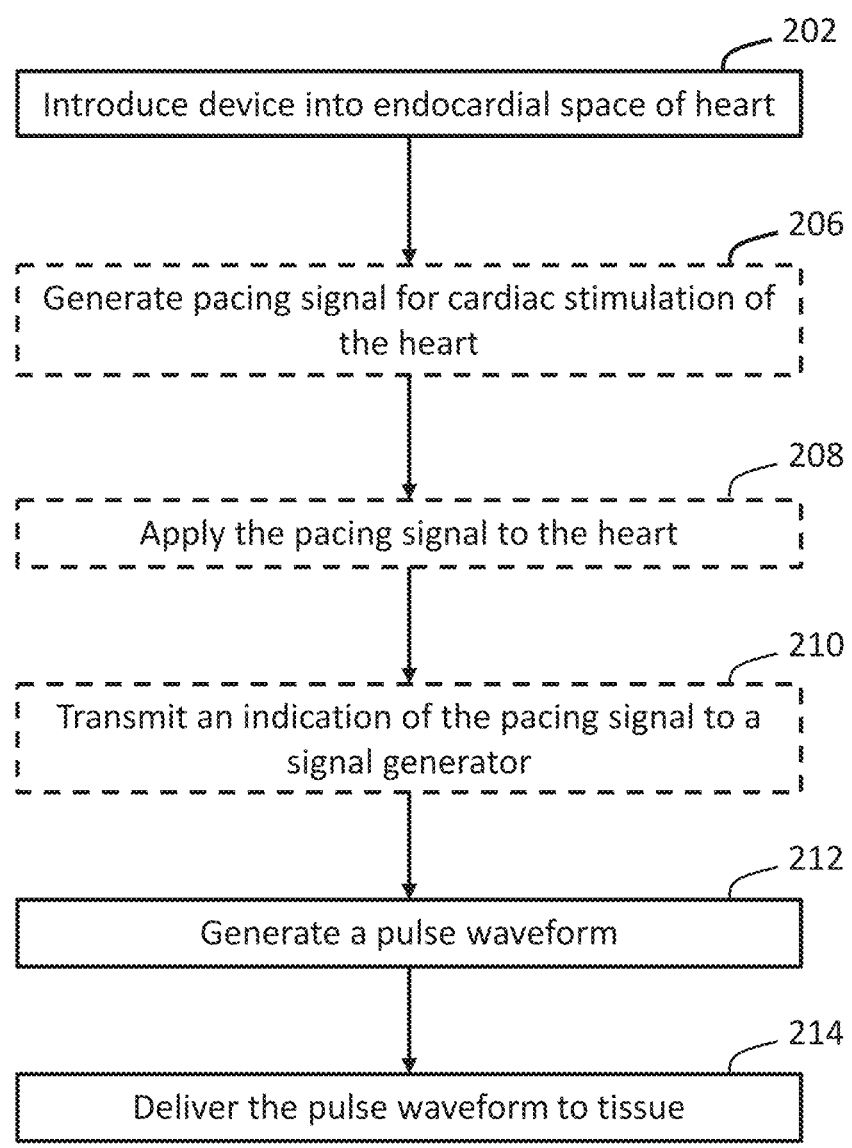
FIG. 2 is a flow diagram of a method for tissue ablation, according to embodiments.

FIG. 2 is an example process 200 of a tissue ablation. Optional steps of the process 200 are indicated in FIG. 2 by dashed lines. The process 200 includes introduction of a device (e.g., ablation device) into an endocardial space of a heart at step 202. In some embodiments, the device may be advanced to be disposed in contact with a pulmonary vein ostium. For example, electrodes of an ablation device may form an approximately circular arrangement of electrodes disposed in contact with an inner radial surface at a pulmonary vein ostium. In some embodiments, the electrodes of the ablation device can be disposed near or adjacent to an endocardial surface of the heart. Optionally, a portion of the ablation device can be deployed (e.g., splines are deployed into a basket, or a balloon is expanded). Optionally, a pacing signal may be generated for cardiac stimulation of the heart at step 206. The pacing signal may then be applied to the heart at step 208. For example, the heart may be electrically paced with a cardiac stimulator to ensure pacing capture to establish periodicity and predictability of the cardiac cycle. One or more of atrial and ventricular pacing may optionally be applied. An indication of the pacing signal may be transmitted to a signal generator at step 210. A time window within the refractory period of the cardiac cycle may then be defined within which one or more voltage pulse waveforms may be delivered. In some embodiments, a refractory time window may follow a pacing signal. For example, a common refractory time window may lie between both atrial and ventricular refractory time windows.

A pulse waveform may be generated, e.g., in synchronization with the pacing signal at step 212 in the case when a pacing signal is employed. For example, a voltage pulse waveform may be applied in a refractory time window. In some embodiments, the pulse waveform may be generated with a time offset with respect to the indication of the pacing signal. For example, the start of a refractory time window may be offset from the pacing signal by a time offset. The voltage pulse waveform(s) may be applied over a series of heartbeats over corresponding common refractory time windows. In other embodiments, a pulse waveform may be generated and applied asynchronously. The generated pulse waveform may be delivered to tissue at step 214. In some embodiments, the pulse waveform may be delivered to pulmonary vein ostium of a heart of a patient via one or more splines of a set of splines of an ablation device. In other embodiments, voltage pulse waveforms as described herein may be selectively delivered to electrode subsets such as anode-cathode subsets for ablation and isolation of the pulmonary vein. For example, a first electrode of a group of electrodes may be configured as an anode and a second electrode of the group of electrodes may be configured as a cathode. These steps may be repeated for a desired number of pulmonary vein ostial or antral regions to have been ablated (e.g., 1, 2, 3, 4 or more ostia). In alternate embodiments, the ablation pulse waveform can be delivered without a pacing signal, i.e., asynchronously delivered.

It should be understood that the examples and illustrations in this disclosure serve exemplary purposes and departures and variations such as numbers of splines, number of electrodes, and so on, or a variety of focal ablation devices such as linear ablation catheters etc. can be built and deployed according to the teachings herein without departing from the scope of this invention.

As used herein, the terms "about" and/or "approximately" when used in conjunction with numerical values and/or ranges generally refer to those numerical values and/or ranges near to a recited numerical value and/or range. In some instances, the terms "about" and "approximately" may mean within ±10% of the recited value. For example, in some instances, "about 100 [units]" may mean within ±10% of 100 (e.g., from 90 to 110). The terms "about" and "approximately" may be used interchangeably.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Field Programmable Gate Arrays (FPGAs), Read-Only Memory (ROM) and Random-Access Memory (RAM) devices. Other embodiments described herein relate to a computer program product, which may include, for example, the instructions and/or computer code disclosed herein.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including C, C++, Java®, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

The specific examples and descriptions herein are exemplary in nature and embodiments may be developed by those skilled in the art based on the material taught herein without departing from the scope of the present invention.

The invention claimed is:

1. An apparatus, comprising:
a first shaft defining a lumen;
a second shaft disposed within the lumen and having a distal portion that extends from a distal end of the first shaft;
a plurality of electrodes configured to generate an electric field for ablating tissue; and
a set of splines, each spline having a longitudinal axis extending along a length of the spline and a lateral axis extending along a width of the spline and perpendicular to the longitudinal axis, each spline of the set of splines including a set of electrodes of the plurality of electrodes formed on that spline, each set of electrodes including a contoured electrode, each contoured electrode including:
a proximal edge and a distal edge spaced along the longitudinal axis,
at least one of the proximal edge and the distal edge being a contoured edge that is angled relative to the lateral axis, wherein the contoured edge comprises an asymmetric and non-uniform wave shape, wherein a first concave portion of the contoured edge has a first radius of curvature and a second concave portion of the contoured edge has a second radius of curvature different from the first radius of curvature,
wherein the set of splines is configured to transition into an expanded configuration in which the set of splines bow radially outward from a longitudinal axis of the first shaft.

2. The apparatus of claim 1, wherein each contoured electrode is configured to reduce an electric field intensity at an interface between the contoured edge of that contoured electrode and the spline on which that contoured electrode is formed.

3. The apparatus of claim 2, wherein each contoured electrode is configured to reduce a drop-off in the electric field intensity in a direction extending away from the contoured edge of that contoured electrode along the longitudinal axis of the spline on which that contoured electrode is formed.

4. The apparatus of claim 1, wherein each contoured electrode is a most distal electrode on the spline on which that contoured electrode is formed.

5. The apparatus of claim 4, wherein the distal edge of each contoured electrode is the contoured edge.

6. The apparatus of claim 4, wherein the proximal edge of each contoured electrode is not the contoured edge and lies within a single plane.

7. The apparatus of claim 1, wherein the contoured edge further comprises a convex portion positioned between the first concave portion and the second concave portion.

8. The apparatus of claim 7, wherein the convex portion of the contoured edge of each contoured electrode is disposed on a side of the spline on which that contoured electrode is formed that faces away from the second shaft.

9. The apparatus of claim 1, wherein the contoured edge has a periodic pattern.

10. The apparatus of claim 1, wherein the radius of curvature of the first concave portion or the second concave portion is at least about 10 microns and less than about 50,000 microns.

11. An apparatus, comprising:
a linear shaft defining a longitudinal axis extending along a length of the shaft and a lateral axis perpendicular to the longitudinal axis; and
a plurality of electrodes disposed on a distal portion of the linear shaft, the plurality of electrodes configured to generate an electric field for ablating tissue, the plurality of electrodes including:
a tip electrode disposed at a distal end of the linear shaft, the tip electrode including a first contoured edge that is angled relative to the lateral axis; and
a set of proximal electrodes disposed proximal of the tip electrode, the set of proximal electrodes including a contoured electrode having a second contoured edge that is angled relative to the lateral axis, the first and second contoured edges each comprising an asymmetric and non-uniform wave shape, the first and second contoured edges each comprising asymmetric concave portions, and wherein the first and second contoured edges comprise one or more tangent discontinuities between adjacent concave portions.

12. The apparatus of claim 11, wherein each of the first and second contoured edges is configured to reduce an electric field intensity at an interface between that contoured edge and the linear shaft.

13. The apparatus of claim 12, wherein each of the first and second contoured edges is configured to reduce a drop-off in the electric field intensity in a direction extending away from that contoured edge along the longitudinal axis of the linear shaft.

14. The apparatus of claim 11, wherein the first contoured edge is a proximal edge of the tip electrode, and the second contoured edge is a distal edge of the contoured electrode which is a proximal electrode from the set of proximal electrodes that is nearest to the tip electrode.

15. The apparatus of claim 11, wherein the tangent discontinuities comprise one or more peaks and the concave portions comprise one or more valleys.

16. The apparatus of claim 15, wherein the one or more peaks of the tangent discontinuities are aligned with the one or more valleys of the corresponding concave portions.

17. The apparatus of claim 11, wherein the tip electrode is configured to be energized with a first polarity and the set of proximal electrodes is configured to be energized with a second polarity opposite to the first polarity to form an electrode pair for generating the electric field.

18. The apparatus of claim 11, further comprising a sleeve disposable over a portion of the linear shaft, the sleeve movable relative to the linear shaft to expose at least a subset of the set of proximal electrodes such that the subset of proximal electrodes can be used to generate the electric field.

* * * * *